United States Patent
Nishijima et al.

(10) Patent No.: US 12,201,240 B2
(45) Date of Patent: *Jan. 21, 2025

(54) HEATING COOKING APPARATUS

(71) Applicant: SHARP KABUSHIKI KAISHA, Osaka (JP)

(72) Inventors: Masahiro Nishijima, Osaka (JP); Masayuki Iwamoto, Osaka (JP); Shinji Asami, Osaka (JP); Tsuyoshi Ootani, Osaka (JP); Hiromi Suenaga, Osaka (JP); Tomohiro Kitaura, Osaka (JP); Yu Shinohara, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 451 days.

This patent is subject to a terminal disclaimer.

(21) Appl. No.: 17/626,928

(22) PCT Filed: Mar. 16, 2020

(86) PCT No.: PCT/JP2020/011445
§ 371 (c)(1),
(2) Date: Jan. 13, 2022

(87) PCT Pub. No.: WO2021/019825
PCT Pub. Date: Feb. 4, 2021

(65) Prior Publication Data
US 2022/0248901 A1 Aug. 11, 2022

(30) Foreign Application Priority Data
Jul. 31, 2019 (JP) .................. 2019-141447

(51) Int. Cl.
A47J 37/06 (2006.01)

(52) U.S. Cl.
CPC ....... *A47J 37/0641* (2013.01); *A47J 37/0664* (2013.01)

(58) Field of Classification Search
CPC .... A47J 37/0641; F24C 15/325; F24C 15/322
(Continued)

(56) References Cited

U.S. PATENT DOCUMENTS

| 8,253,084 B2 | 8/2012 | Toyoda et al. |
| 10,154,549 B2 | 12/2018 | Nasu et al. |

(Continued)

FOREIGN PATENT DOCUMENTS

| CN | 103884030 A | 6/2014 |
| CN | 206261491 U * | 6/2017 |

(Continued)

OTHER PUBLICATIONS

Third Party Observation concerning the International Application No. PCT/JP2020/011445 mailed on Jul. 8, 2021.

*Primary Examiner* — Ko-Wei Lin
(74) *Attorney, Agent, or Firm* — ScienBiziP, P.C.

(57) ABSTRACT

A heating cooking apparatus includes a heating cooking chamber (100A), a first air sending unit (14), and a second air sending unit (13). The heating cooking chamber (100A) accommodates an object to be heated. The first air sending unit (14) supplies a first hot air (F1) to the heating cooking chamber (100A). The second air sending unit (13) supplies a second hot air (F2) to the heating cooking chamber (100A) from a direction different from the supply direction of the first hot air (F1) supplied by the first air sending unit (14). The heating cooking chamber (100A) includes an accommodation space (120) that accommodates an object to be heated.

9 Claims, 19 Drawing Sheets

(58) Field of Classification Search
USPC .......................................................... 126/21 A
See application file for complete search history.

(56) References Cited

U.S. PATENT DOCUMENTS

| | | |
|---|---|---|
| 10,371,391 B2 | 8/2019 | Tcaciuc |
| 2005/0005781 A1* | 1/2005 | Ohtsuka ................ F24C 15/325 99/476 |
| 2010/0133263 A1 | 6/2010 | Toyoda et al. |
| 2012/0187115 A1 | 7/2012 | Toyoda et al. |
| 2012/0192725 A1 | 8/2012 | Toyoda et al. |
| 2015/0000539 A1 | 1/2015 | Tcaciuc |
| 2017/0171921 A1 | 6/2017 | Nasu et al. |

FOREIGN PATENT DOCUMENTS

| | | |
|---|---|---|
| EP | 1437552 A1 | 7/2004 |
| EP | 2636955 A1 | 9/2013 |
| FR | 2686400 A1 | 7/1993 |
| JP | 2010-133634 A | 6/2010 |
| KR | 2001-0004083 A | 1/2001 |

\* cited by examiner

HEATING COOKING APPARATUS

TECHNICAL FIELD

The present invention relates to a heating cooking apparatus.

BACKGROUND ART

PTL 1 discloses a pull-out heating cooking apparatus. The pull-out heating cooking apparatus disclosed in PTL 1 includes a heating cooking apparatus main body and a pull-out body. The heating cooking apparatus main body includes a heating cooking chamber. The pull-out body can be drawn toward the outside of the heating cooking apparatus main body from a state where the pull-out body is accommodated in the heating cooking chamber.

Heating functions of the pull-out heating cooking apparatus disclosed in PTL 1 include a microwave heating function and a rapid hot air heating function. The microwave heating function is a function of applying microwaves toward an object to be heated. The rapid hot air heating function is a function of blowing hot air from a top blow-out port and a side blow-out port toward an object to be heated and suctioning hot air from a side suction port. The top blow-out port is formed in a top wall of the heating cooking chamber. The side blow-out port is formed in a left side wall of the heating cooking chamber. The side suction port is formed in a back side wall of the heating cooking chamber.

CITATION LIST

Patent Literature

PTL 1: JP 2010-133634 A

SUMMARY OF INVENTION

Technical Problem

Furthermore, in recent years, there has been a demand for easily heating a desired region in a heating cooking chamber with hot air.

In light of the above problem, an object of the present invention is to provide a heating cooking apparatus that can easily heat a desired region in a heating cooking chamber.

Solution to Problem

A heating cooking apparatus according to the present invention includes a heating cooking chamber, a first air sending unit, and a second air sending unit. The heating cooking chamber accommodates an object to be heated. The heating cooking chamber has an accommodation space for accommodating the object to be heated. The first air sending unit includes a first suction hole portion located in a first direction with respect to the accommodation space, and a first blow-out hole portion located in the first direction with respect to the accommodation space. The second air sending unit includes a second suction hole portion located in a second direction different from the first direction with respect to the accommodation space, and a second blow-out hole portion located in the second direction with respect to the accommodation space. The first air sending unit suctions air inside the heating cooking chamber through the first suction hole portion and blows air into the heating cooking chamber through the first blow-out hole portion. The second air sending unit suctions air inside the heating cooking chamber through the second suction hole portion and blows air into the heating cooking chamber through the second blow-out hole portion.

Advantageous Effects of Invention

According to a heating cooking apparatus of the present invention, a desired area in a heating cooking chamber can be easily heated.

DESCRIPTION OF EMBODIMENTS

Figure 1:
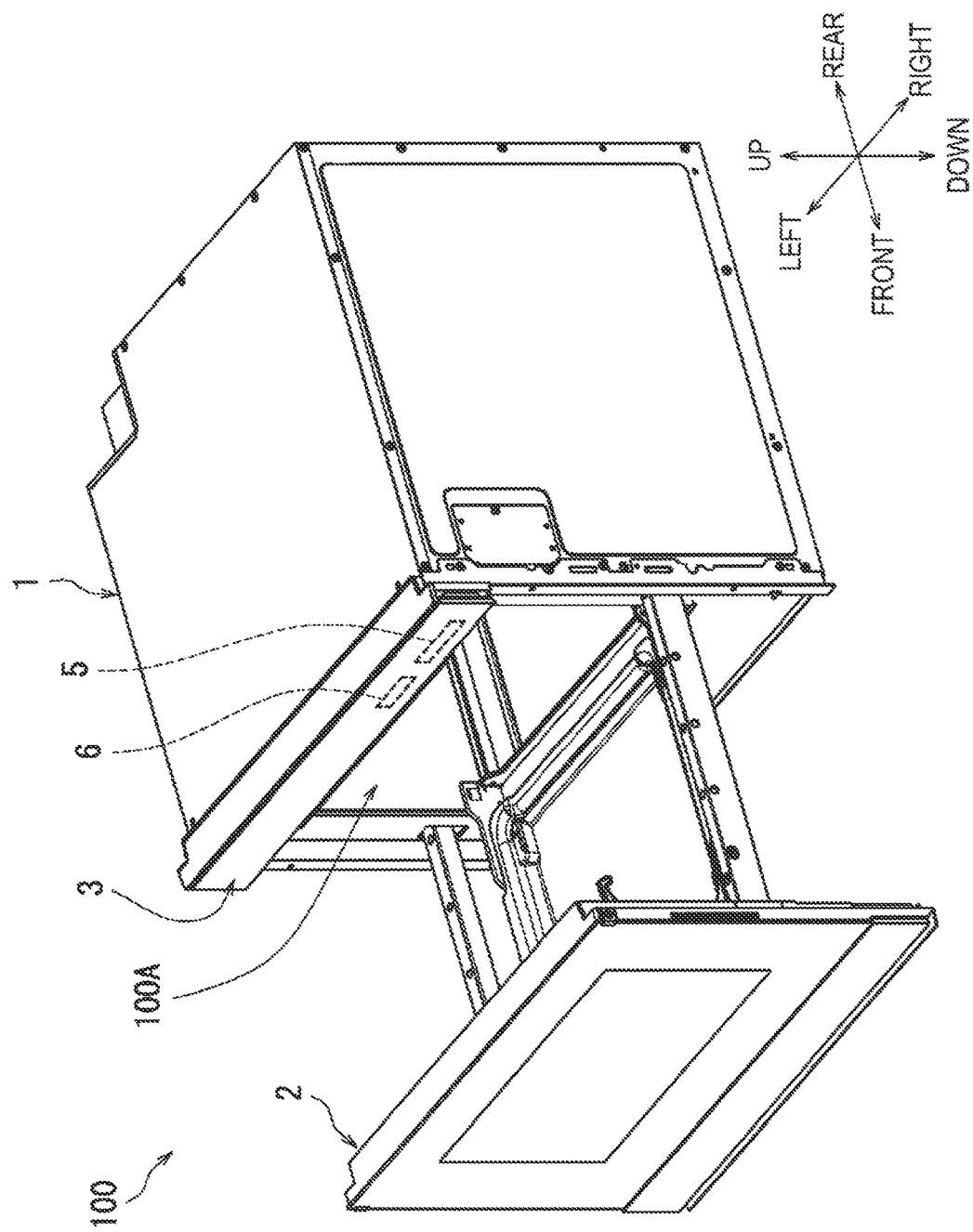
FIG. 1 is a perspective view illustrating an appearance of a pull-out heating cooking apparatus according to an embodiment of the present invention.

Hereinafter, an embodiment of a pull-out heating cooking apparatus according to the present invention will be described with reference to the drawings. In the drawings, the same or equivalent components are denoted by the same reference signs and description thereof will not be repeated.

Figure 2:
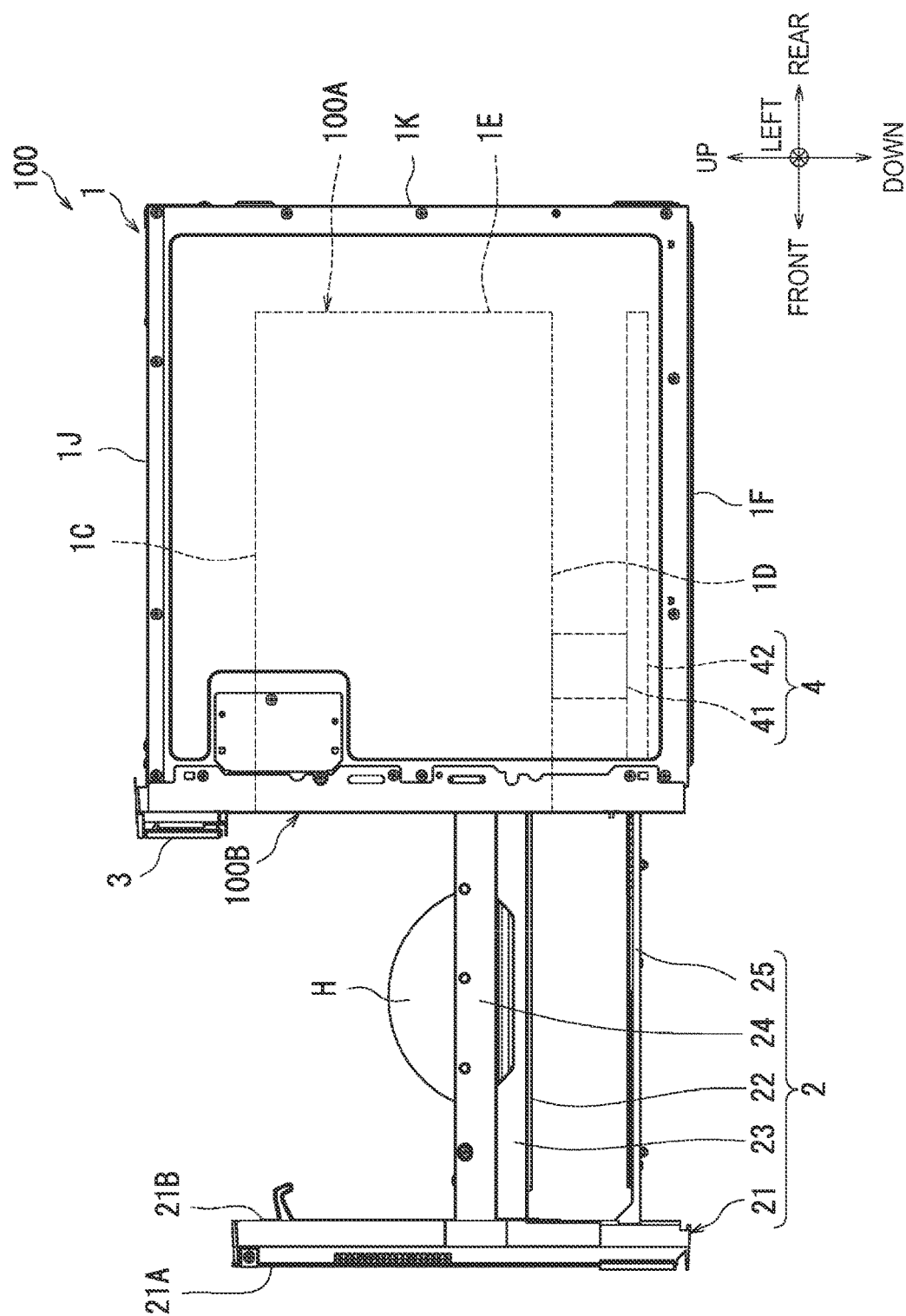
FIG. 2 is a right side view illustrating the pull-out heating cooking apparatus according to the present embodiment.
Figure 3:
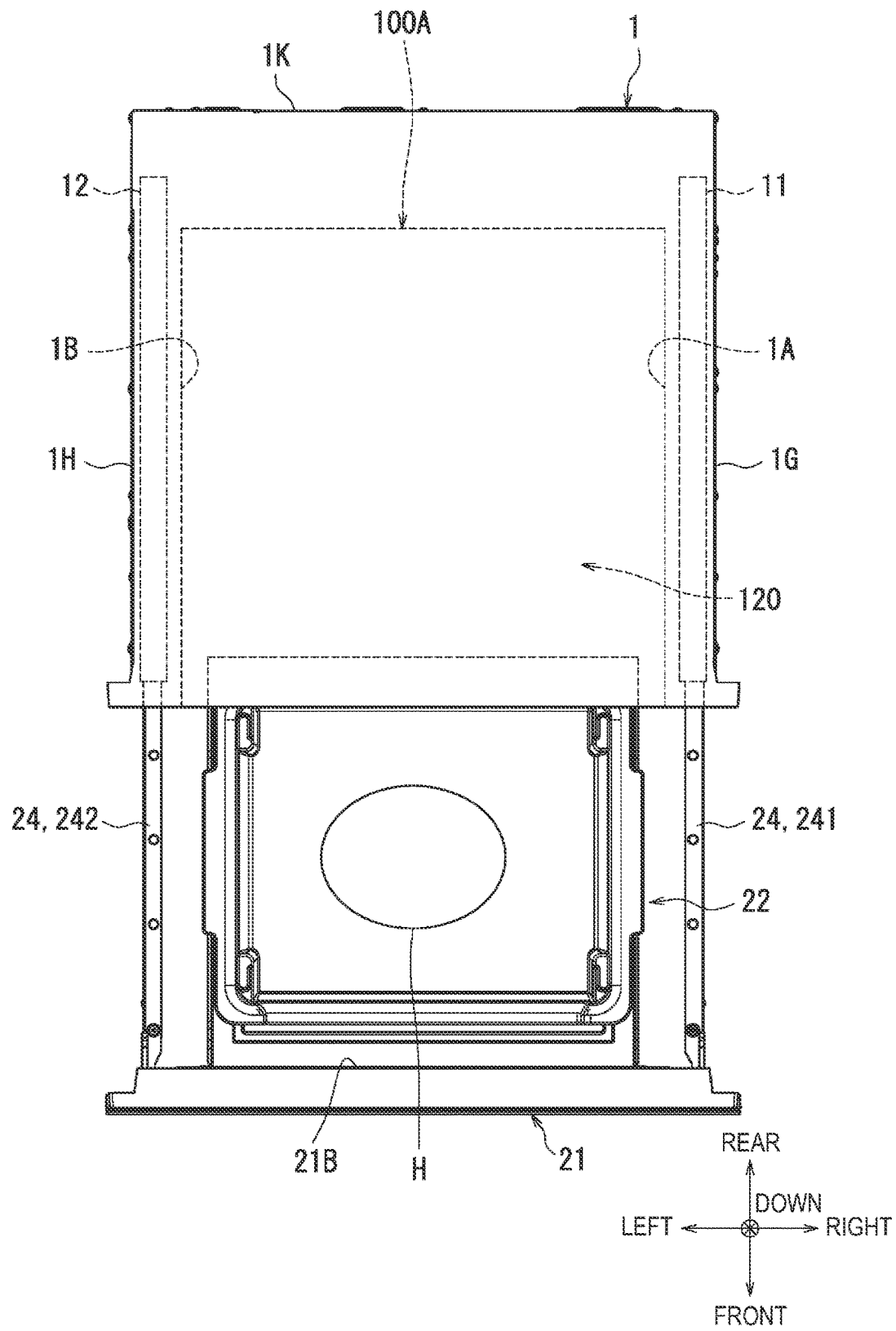
FIG. 3 is a top view illustrating the pull-out heating cooking apparatus according to the present embodiment.

A pull-out heating cooking apparatus 100 according to the present embodiment will be described with reference to FIG. 1 to FIG. 3. FIG. 1 is a perspective view illustrating an appearance of the pull-out heating cooking apparatus 100 according to the present embodiment. FIG. 2 is a right side view illustrating the pull-out heating cooking apparatus 100 according to the present embodiment. FIG. 3 is a top view illustrating the pull-out heating cooking apparatus 100 according to the present embodiment. More specifically, FIG. 1 to FIG. 3 illustrate the pull-out heating cooking apparatus 100 in a state where a pull-out body 2 is pulled out. Further, FIG. 1 illustrates the appearance of the pull-out heating cooking apparatus 100 when viewed from above obliquely from the right. The pull-out heating cooking apparatus 100 is one example of a heating cooking apparatus.

The pull-out heating cooking apparatus 100 heats and cooks an object H to be heated. The object H to be heated is, for example, a food product. As illustrated in FIG. 1, the pull-out heating cooking apparatus 100 includes a heating chamber 1, the pull-out body 2, an operation panel 3, a control unit 5, and a storage unit 6.

In the present embodiment, a side on which the operation panel 3 of the pull-out heating cooking apparatus 100 is disposed is defined as a front side of the pull-out heating cooking apparatus 100, and a side opposite to the front side is defined as a rear side of the pull-out heating cooking apparatus 100. Further, a right side of the pull-out heating cooking apparatus 100 when the pull-out heating cooking apparatus 100 is viewed from the front side is defined as a right side, and a side opposite to the right side is defined as a left side of the pull-out heating cooking apparatus 100. Further, in a direction orthogonal to a front-rear direction and a left-right direction of the pull-out heating cooking apparatus 100, a side on which the operation panel 3 is disposed is defined as an upper side of the pull-out heating cooking apparatus 100, and a side opposite to the upper side is defined as a lower side of the pull-out heating cooking apparatus 100. Note that these orientations do not limit the orientation of the pull-out heating cooking apparatus according to the present invention when in use.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 also includes a heating cooking chamber 100A therein.

The heating cooking chamber 100A includes an accommodation space 120 that accommodates the object H to be heated. The accommodation space 120 has a predetermined capacity as a space that can accommodate the object H to be heated. The heating cooking chamber 100A further includes a right wall 1A, a left wall 1B, a top wall 1C, a bottom wall 1D, and a back wall 1E. The shape of the heating cooking chamber 100A is, for example, a substantially rectangular parallelepiped shape. Materials of the right wall 1A, the left wall 1B, the top wall 1C, the bottom wall 1D, and the back wall 1E are, for example, a metal. The heating cooking chamber 100A further includes an opening 100B that communicates with the outside of the heating cooking chamber 100A. More specifically, the front side of the heating cooking chamber 100A is opened to allow the object H to be heated to be inserted and removed.

The heating chamber 1 further includes a space between the bottom wall 1D and the bottom outer wall 1F. The heating chamber 1 further includes a space between the right wall 1A and the right outer wall 1G. The heating chamber 1 further includes a space between the left wall 1B and the left outer wall 1H. The heating chamber 1 further includes a space between the top wall 1C and the top outer wall 1J. The heating chamber 1 further includes a space between the back wall 1E and the back outer wall 1K.

The operation panel 3 includes an operation unit and a display portion. The operation unit receives an operation from a user. The operation unit includes various types of keys. The display portion displays various pieces of information. The display portion includes a liquid crystal panel. The operation panel 3 is located on an upper portion of a front face of the heating chamber 1.

The storage unit 6 includes a random access memory (RAM) and a read only memory (ROM). The storage unit 6 stores control programs used for controlling operations of each part of the pull-out heating cooking apparatus 100. The storage unit 6 stores setting information input when the operation panel 3 is operated.

The control unit 5 is a hardware circuit that includes a processor such as a central processing unit (CPU). The control unit 5 executes a control program stored in the storage unit 6.

Next, the pull-out body 2 will be described in detail. The pull-out body 2 can be pulled out of and pushed into the heating chamber 1. Specifically, the pull-out body 2 includes a door portion 21, a placing portion 22, and a support portion 23. The door portion 21 can open and close an opening on the front side of the heating cooking chamber 100A. The door portion 21 is a substantially rectangular plate-like member. The door portion 21 includes a front face 21A and a rear face 21B. The door portion 21 opens the opening on the front side of the heating cooking chamber 100A in a state where the pull-out body 2 is pulled out of the heating cooking chamber 100A. The door portion 21 closes the opening on the front side of the heating cooking chamber 100A in a state where the pull-out body 2 is pulled into the heating cooking chamber 100A. Meanwhile, in a state where the pull-out body 2 is pushed into the heating cooking chamber 100A, a distance between the top wall 1C and the bottom wall 1D is shorter than a distance between the back wall 1E and the rear face 21B.

The object H to be heated can be placed on the placing portion 22. The placing portion 22 is, for example, a plate-like member made of ceramic or glass. The support portion 23 is fixed to the rear face 21B of the door portion 21, and supports a peripheral portion of the placing portion 22 such that the placing portion 22 is held in a horizontal state. A material of the support portion 23 includes a metal. The placing portion 22 and the support portion 23 are pulled out of the heating cooking chamber 100A to the outside by pulling out the pull-out body 2. The placing portion 22 and the support portion 23 are accommodated in the heating cooking chamber 100A in a state where the pull-out body 2 is pulled in.

Next, a drive mechanism of the pull-out body 2 will be described in detail. The pull-out body 2 further includes a pair of slide members 24 and a support member 25 in addition to the door portion 21, the support portion 23, and the placing portion 22.

The pair of slide members 24 regulate the movement direction of the pull-out body 2 in the front-rear direction. In other words, the pair of slide members 24 regulate the movement direction of the pull-out body 2 in the front-rear direction. The pair of slide members 24 are fixed to the rear face 21B of the door portion 21. Specifically, the pair of slide members 24 includes a right slide member 241 and a left slide member 242. Each of the right slide member 241 and the left slide member 242 is a member having the front-rear direction as a longitudinal direction. The right slide member 241 and the left slide member 242 oppose each other in the left-right direction. One end portion of the right slide member 241 is attached to a right edge portion of the rear face 21B of the door portion 21. One end portion of the left slide member 242 is attached to a left edge portion of the rear face 21B of the door portion 21.

Meanwhile, the heating chamber 1 further includes a right slide rail 11 and a left slide rail 12. The right slide rail 11 is fixed in a space between the right wall 1A and the right outer wall 1G. The left slide rail 12 is fixed in a space between the left wall 1B and the left outer wall 1H. Each of the right slide rail 11 and the left slide rail 12 is a member having the front-rear direction as a longitudinal direction. The right slide member 241 is supported to be slidable along the right slide rail 11. The left slide member 242 is supported to be slidable along the left slide rail 12.

Furthermore, the support member 25 supports the door portion 21. More specifically, the support member 25 regulates the movement direction of the pull-out body 2 in the front-rear direction. In other words, the support member 25 regulates the movement direction of the pull-out body 2 in the front-rear direction. One end portion of the support member 25 is attached at a center portion in the left-right direction of the rear face 21B of the door portion 21 and below the placing portion 22. The support member 25 is a member having the front-rear direction as a longitudinal direction. The support member 25 includes a rack portion. The rack portion includes a plurality of teeth.

Meanwhile, the heating chamber 1 further includes a drive mechanism 4. The drive mechanism 4 is accommodated in a space between the bottom wall 1D and the bottom outer wall 1F. For example, the drive mechanism 4 includes a drive motor 41, a pinion, and a drive rail 42. The pinion is attached to a tip end portion of the drive motor 41. The drive rail 42 is fixed in a space between the bottom wall 1D and the bottom outer wall 1F. The drive rail 42 is a member having the front-rear direction as a longitudinal direction. The support member 25 is supported to be slidable along the drive rail 42. The pinion engages with the rack portion of the support member 25. Furthermore, the support member 25 moves in the front-rear direction when the pinion rotates. As the support member 25 moves in the front-rear direction, the pair of slide members 24 also move in the front-rear direction. As a result, the pull-out body 2 is in an open state or a closed state.

Figure 4:
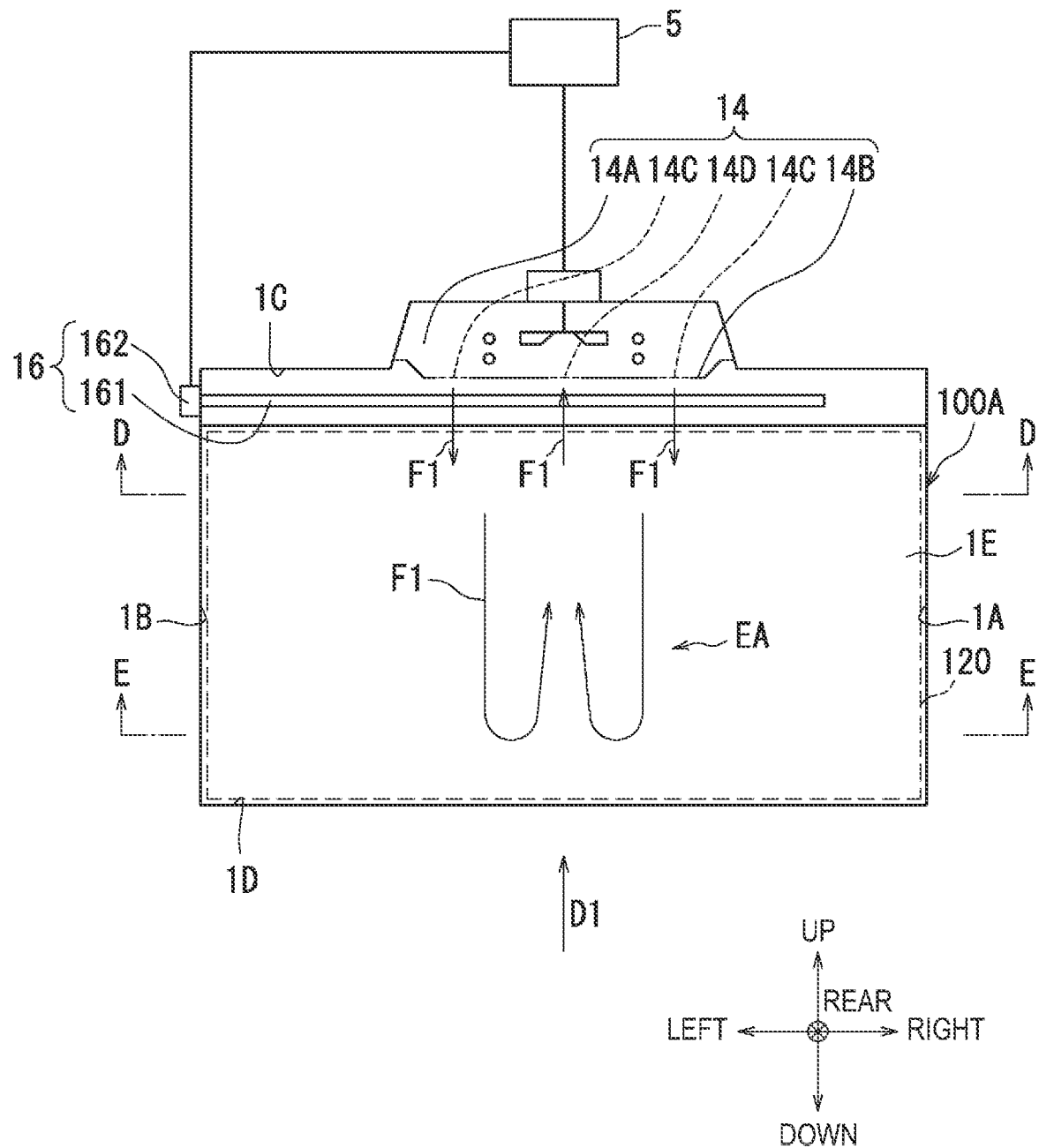
FIG. 4 is a diagram illustrating a schematic cross section of a heating cooking chamber according to the present embodiment.
Figure 5:
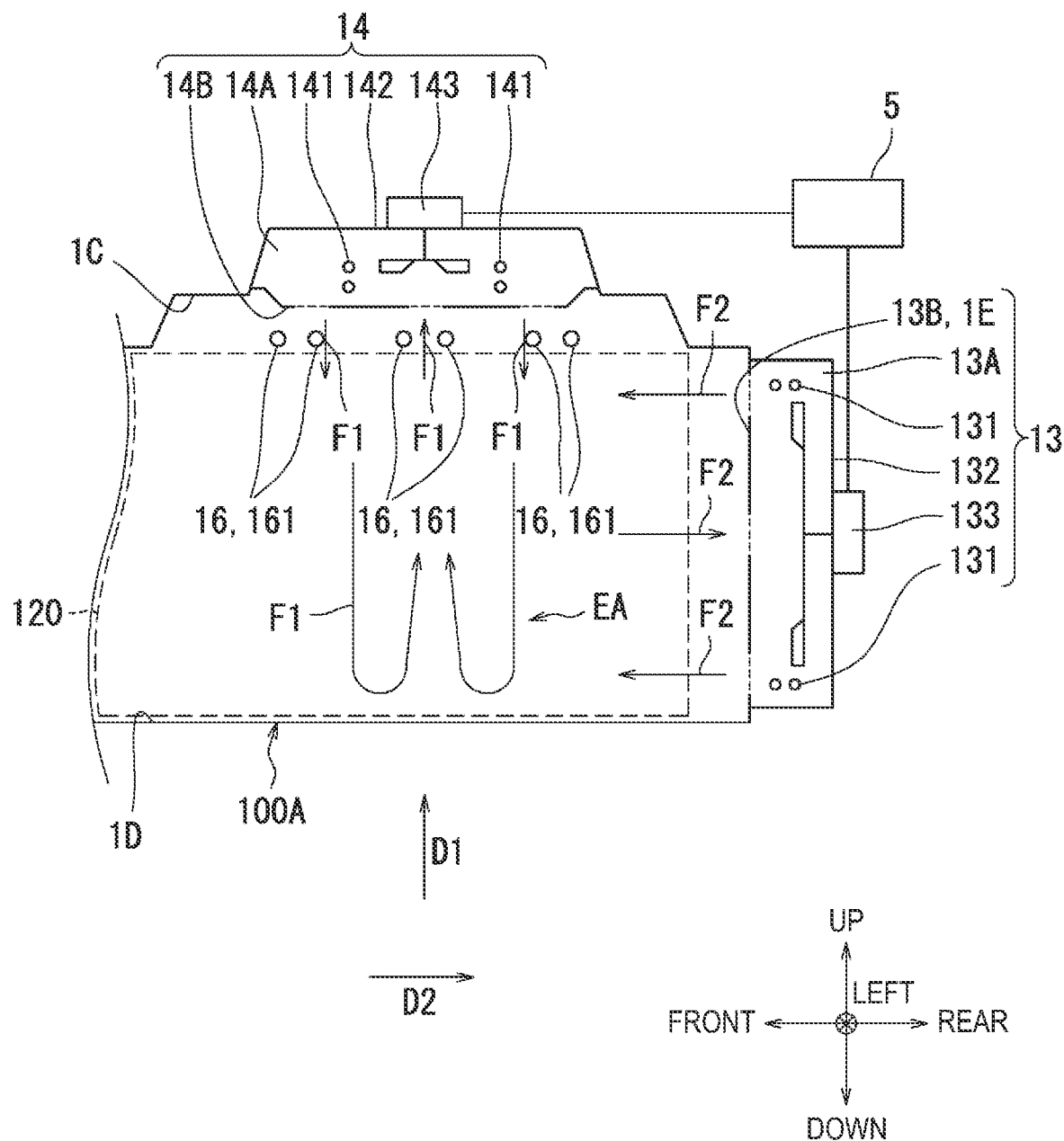
FIG. 5 is a diagram illustrating a schematic cross section of the heating cooking chamber according to the present embodiment.

Next, the heating cooking chamber 100A according to the present embodiment will be further described with reference to FIG. 1 to FIG. 5. FIG. 4 and FIG. 5 are diagrams illustrating a schematic cross section of the heating cooking chamber 100A according to the present embodiment. More specifically, FIG. 4 illustrates a cross section of the heating cooking chamber taken along a plane orthogonal to the front-rear direction. FIG. 5 illustrates a cross section of the heating cooking chamber taken along a plane orthogonal to the left-right direction.

As illustrated in FIG. 4 and FIG. 5, the pull-out heating cooking apparatus 100 further includes a first air sending unit 14. The first air sending unit 14 supplies a first hot air F1 to the heating cooking chamber 100A.

Specifically, the first air sending unit 14 includes a first suction hole portion 14D, a first blow-out hole portion 14C, and a first partitioning member 14B. The first suction hole portion 14D is positioned in a first direction D1 with respect to the accommodation space 120. The first blow-out hole portion 14C is positioned in the first direction D1 with respect to the accommodation space 120. The first direction D1 is, for example, a vertical upward direction. More specifically, the first air sending unit 14 is positioned above the heating cooking chamber 100A via the top wall 1C. The first suction hole portion 14D is positioned above the accommodation space 120. The first blow-out hole portion 14C is positioned above the accommodation space 120.

The first air sending unit 14 suctions the first hot air F1 in the heating cooking chamber 100A through the first suction hole portion 14D and blows the first hot air F1 into the heating cooking chamber 100A through the first blow-out hole portion 14C. More specifically, the first air sending unit 14 suctions the first hot air F1 from a predetermined region EA in the accommodation space 120 and blows out the first hot air F1 into the predetermined region EA within the accommodation space 120. The predetermined region EA is, for example, a central region within the accommodation space 120. For example, a center portion of the object H to be heated is disposed in the predetermined region EA.

As described above, according to the pull-out heating cooking apparatus 100, the first suction hole portion 14D and the first blow-out hole portion 14C are positioned in the same first direction D1 with respect to the accommodation space 120, which reduces the distance between the first suction hole portion 14D and the first blow-out hole portion 14C. As a result, a circulation path of the first hot air F1 is also reduced. Thus, the predetermined region EA within the heating cooking chamber 100A can be heated in a short period of time.

Furthermore, the first suction hole portion 14D and the first blow-out hole portion 14C are positioned above the heating cooking chamber 100A. When the heating cooking chamber 100A has a rectangular parallelepiped shape having a short distance between the top wall 1C and the bottom wall 1D and the predetermined region EA is a central region within the accommodation space 120, a distance between the first suction hole portion 14D and the predetermined region EA and a distance between the first blow-out hole portion 14C and the predetermined region EA are reduced. As a result, the predetermined region EA within the heating cooking chamber 100A can be heated by the first air sending unit 14 within a shorter period of time.

More specifically, the first air sending unit 14 further includes a first air sending chamber 14A, a first heater 141, a first centrifugal fan 142, and a first drive unit 143. The first air sending chamber 14A is, for example, a box-like member. The first centrifugal fan 142 includes a plurality of blades.

The first heater 141 and the first centrifugal fan 142 are accommodated in the first air sending chamber 14A. The first heater 141 generates the first hot air F1 by heating air in the first air sending chamber 14A. Specifically, the shape of the first heater 141 is a circular ring when viewed from the upper side to the lower side. Further, the first heater 141 is disposed along the outer circumference of the first centrifugal fan 142.

The first drive unit 143 is positioned outside of the first air sending chamber 14A. The first drive unit 143 energizes the first heater 141 and drives the first centrifugal fan 142. The first drive unit 143 includes, for example, a motor and an energization unit. The first drive unit 143 is controlled by the control unit 5. That is, the control unit 5 controls driving of the first air sending unit 14.

Figure 6:
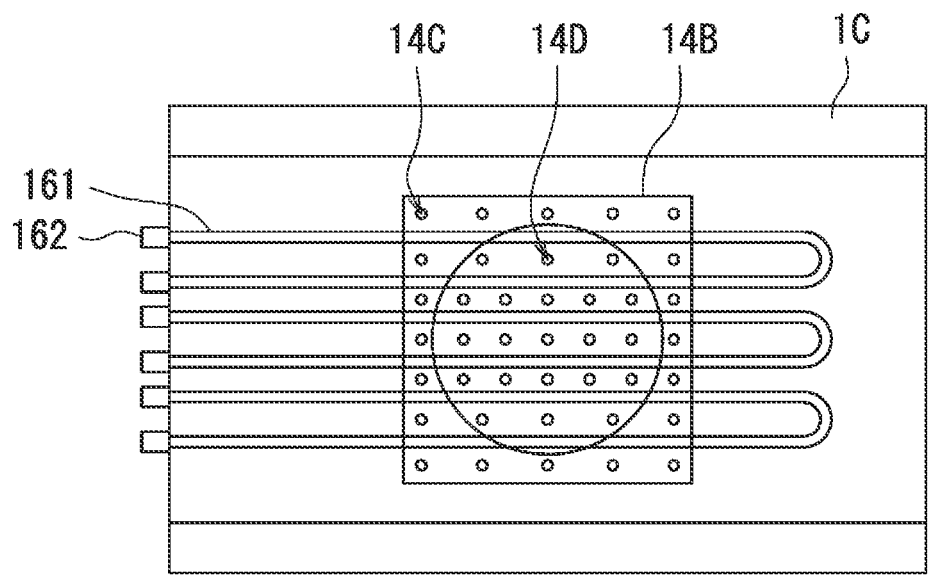
FIG. 6 is a diagram illustrating a top wall on which a first partitioning member according to the present embodiment is disposed.
Figure 6:
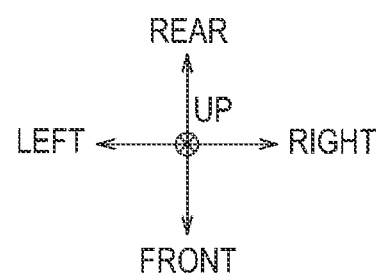

Next, the first air sending unit 14 according to the present embodiment will be further described with reference to FIG. 1 to FIG. 6. FIG. 6 is a diagram illustrating the top wall 1C in which the first partitioning member 14B according to the present embodiment is disposed.

The first partitioning member 14B is positioned above the accommodation space 120. Specifically, the first partitioning member 14B is positioned between the first air sending chamber 14A and the heating cooking chamber 100A. The first partitioning member 14B is, for example, a plate-like member made of a metal. The shape of the first partitioning member 14B is, for example, a square shape when viewed from the upper side to the lower side. The first partitioning member 14B is disposed in a substantially center portion of the top wall 1C. The first suction hole portion 14D and the first blow-out hole portion 14C are disposed in the first partitioning member 14B. Thus, the first suction hole portion 14D and the first blow-out hole portion 14C can be easily disposed above the accommodation space 120.

More specifically, the first suction hole portion 14D is, for example, a set of a plurality of punched holes. Similarly, the first blow-out hole portion 14C is, for example, a set of a plurality of punched holes. The punched holes are examples of suction holes and blow-out holes. The punched holes each have, for example, a circular shape. The diameter of each of the punched holes of the first suction hole portion 14D and the first blow-out hole portion 14C is, for example, 3.4 mm. Thus, each of the first suction hole portion 14D and the first blow-out hole portion 14C has a small size. As a result, it is possible to prevent a tool or the like from being caught in the first suction hole portion 14D and the first blow-out hole portion 14C when the heating cooking chamber 100A is cleaned.

More specifically, the first blow-out hole portion 14C surrounds the first suction hole portion 14D. Specifically, the first suction hole portion 14D is positioned at the center portion of the first partitioning member 14B. The set of the plurality of punched holes of the first suction hole portion 14D has, for example, a circular shape. On the other hand, the first blow-out hole portion 14C is formed along the outer circumference of the first suction hole portion 14D. The set of the plurality of punched holes of the first blow-out hole portion 14C has, for example, an annular shape.

The first centrifugal fan 142 opposes the heating cooking chamber 100A through the first partitioning member 14B. The first suction hole portion 14D opposes the first centrifugal fan 142.

Here, flow of the first hot air F1 will be described in detail. First, the first air sending unit 14 suctions the first hot air F1 in the heating cooking chamber 100A into the first air sending chamber 14A through the first suction hole portion 14D by the first centrifugal fan 142. The first hot air F1 taken into the first air sending chamber 14A is heated by the first heater 141. The first air sending unit 14 blows the first hot air F1 in the first air sending chamber 14A into the heating cooking chamber 100A through the first blow-out hole portion 14C by the first centrifugal fan 142. The first hot air F1 blown into the heating cooking chamber 100A moves downward. Thereafter, the first hot air F1 that has reached the peripheral region of the predetermined region EA in the heating cooking chamber 100A moves, for example, toward the central region of the predetermined region EA and moves upward so that the movement direction of the first hot air F1 is reversed. The first hot air F1 moving upward moves within the heating cooking chamber 100A. Thereafter, the first hot air F1 is taken into the first air sending chamber 14A again from the first suction hole portion 14D. In this manner, the first air sending unit 14 circulates the first hot air F1 between the first air sending chamber 14A and the predetermined region EA in the heating cooking chamber 100A.

As described above, according to the pull-out heating cooking apparatus 100, the first blow-out hole portion 14C surrounds the first suction hole portion 14D, and thus it is possible to more uniformly heat the predetermined region EA in the heating cooking chamber 100A.

Figure 7A:
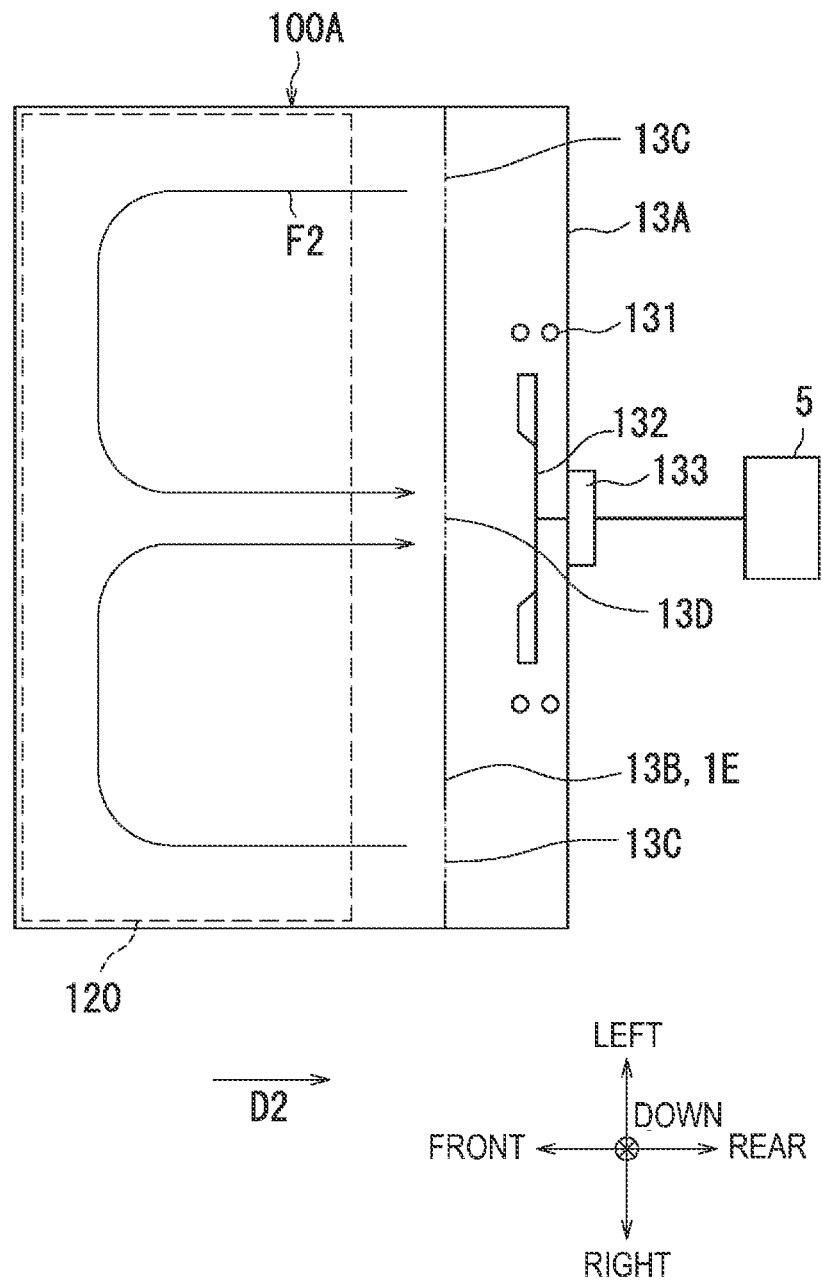
FIG. 7A is a diagram illustrating a schematic cross section of the heating cooking chamber according to the present embodiment.

Next, a second air sending unit 13 according to the present embodiment will be described with reference to FIG. 1 to FIG. 7A. FIG. 7A is a diagram illustrating a schematic cross section of the heating cooking chamber 100A according to the present embodiment. More specifically, FIG. 7A illustrates a cross section of the heating cooking chamber 100A taken along a plane orthogonal to an up-down direction.

As illustrated in FIG. 5 and FIG. 7A, the pull-out heating cooking apparatus 100 further includes the second air sending unit 13. The second air sending unit 13 supplies a second hot air F2 to the heating cooking chamber 100A.

Specifically, the second air sending unit 13 includes a second suction hole portion 13D, a second blow-out hole portion 13C, and a second partitioning member 13B. The second suction hole portion 13D is positioned in a second direction D2 with respect to the accommodation space 120. The second blow-out hole portion 13C is positioned in the second direction D2 with respect to the accommodation space 120. The second direction D2 is different from the first direction D1. Specifically, the second direction D2 intersects the first direction D1. More specifically, the second air sending unit 13 is positioned behind the heating cooking chamber 100A via the back wall 1E. The second suction hole portion 13D is positioned at the rear of the accommodation space 120. The second blow-out hole portion 13C is positioned at the rear of the accommodation space 120.

The second air sending unit 13 suctions the second hot air F2 in the heating cooking chamber 100A through the second suction hole portion 13D and blows the second hot air F2 into the heating cooking chamber 100A through the second blow-out hole portion 13C. The direction in which the second hot air F2 is supplied by the second air sending unit 13 is different from the direction in which the first hot air F1 is supplied by the first air sending unit 14. More specifically, the second air sending unit 13 suctions the second hot air F2 from a center portion in the heating cooking chamber 100A and blows out the second hot air F2 to a peripheral portion in the heating cooking chamber 100A.

As described above, according to the pull-out heating cooking apparatus 100, the second suction hole portion 13D and the second blow-out hole portion 13C are positioned in the second direction D2 with respect to the accommodation space 120, which reduces the distance between the second suction hole portion 13D and the second blow-out hole portion 13C. As a result, the circulation path of the second hot air F2 is also reduced. Thus, the entire inside of the heating cooking chamber 100A can be heated in a short period of time.

Figure 7B:
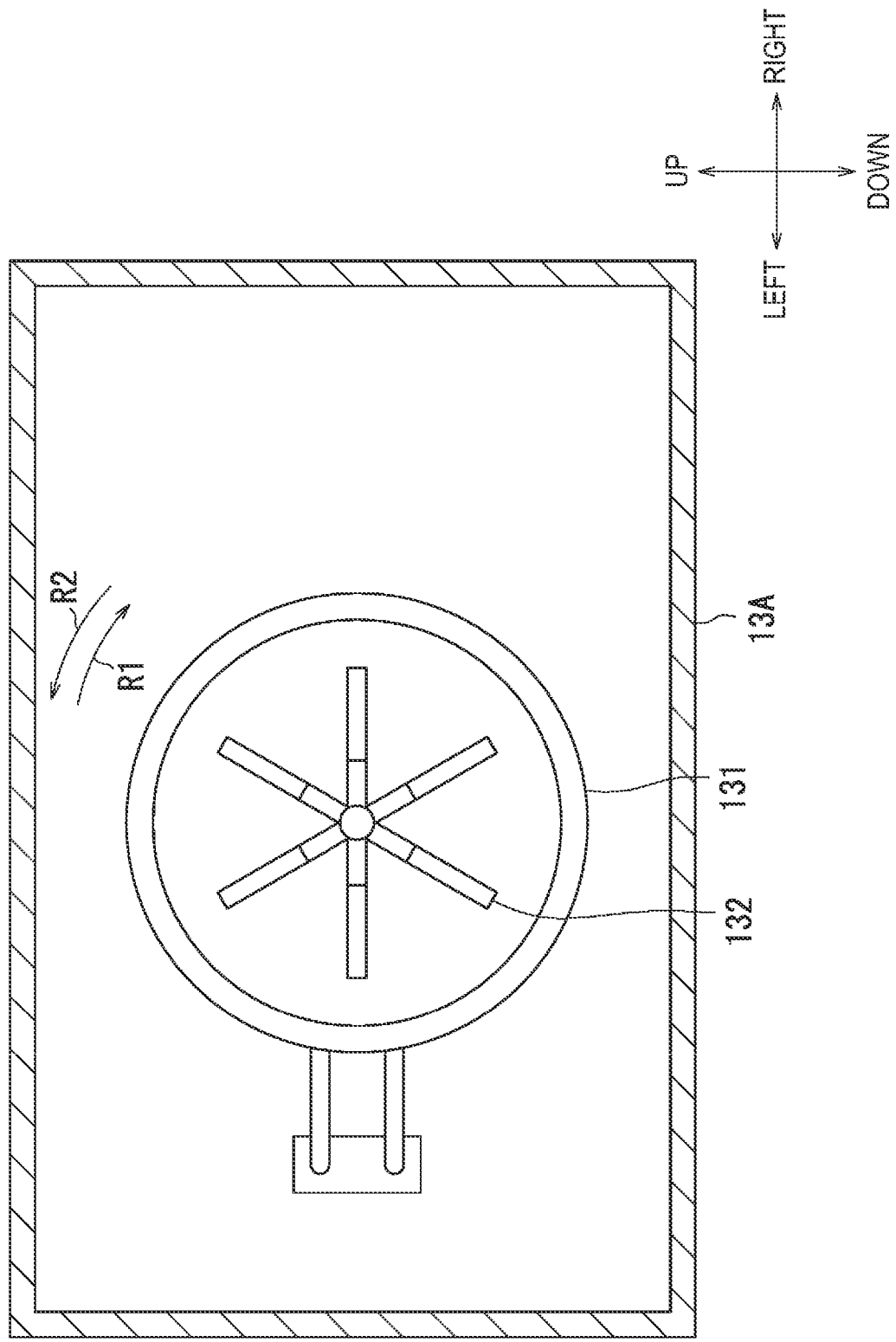
FIG. 7B is a diagram illustrating a schematic cross section of a second air sending unit according to the present embodiment.

Here, the second air sending unit 13 will be described in detail with reference to FIG. 7B. FIG. 7B is a diagram illustrating a schematic cross section of the second air sending unit 13. As illustrated in FIG. 7A and FIG. 7B, the second air sending unit 13 further includes a second air sending chamber 13A, a second heater 131, a second centrifugal fan 132, and a second drive unit 133. The second air sending chamber 13A is, for example, a box-like member. The second centrifugal fan 132 includes a plurality of blades. The number of blades of the second centrifugal fan 132 is smaller than the number of blades of the first centrifugal fan 142. In the present embodiment, the size of the second centrifugal fan 132 is greater than the size of the first centrifugal fan 142. In other words, the size of the first centrifugal fan 142 is smaller than the size of the second centrifugal fan 132. More specifically, the diameter of the first centrifugal fan 142 is smaller than the diameter of the second centrifugal fan 132. As a result, deflection that occurs when the first centrifugal fan 142 rotates is smaller than deflection that occurs when the second centrifugal fan 132 rotates. Further, the thickness of the first centrifugal fan 142 along the rotation axis is smaller than the thickness of the second centrifugal fan 132 along the rotation axis. Accordingly, the size of the first air sending chamber 14A is smaller than the size of the second air sending chamber 13A. In particular, the thickness of the first air sending chamber 14A along the rotation axis is smaller than the thickness of the second air sending chamber 13A along the rotation axis. As a result, the predetermined region EA in the heating cooking chamber 100A can be heated in a short period of time by driving the first air sending unit 14, and the entire inside of the heating cooking chamber 100A can be heated by driving the second air sending unit 13.

The second heater 131 and the second centrifugal fan 132 are accommodated in the second air sending chamber 13A. The second heater 131 heats air in the second air sending chamber 13A to generate the second hot air F2. Specifically, the shape of the second heater 131 is a circular ring when viewed from the front side to the rear side. Further, the second heater 131 is disposed along the outer circumference of the second centrifugal fan 132.

The second drive unit 133 is positioned outside of the second air sending chamber 13A. The second drive unit 133 energizes the second heater 131 and drives the second centrifugal fan 132. The second drive unit 133 includes, for example, a motor and an energization unit.

The second drive unit 133 is controlled by the control unit 5. In other words, the control unit 5 controls the driving of the second air sending unit 13. In the present embodiment, the second drive unit 133 drives the second centrifugal fan 132 so that the rotation speed of the first centrifugal fan 142 becomes higher than the rotation speed of the second centrifugal fan 132. As a result, the second hot air F2 can heat the entire inside of the heating cooking chamber 100A.

The control unit 5 controls the driving of each of the first air sending unit 14 and the second air sending unit 13. Specifically, the control unit 5 controls the first air sending unit 14 so that the first air sending unit 14 is driven. The control unit 5 controls the second air sending unit 13 so that the second air sending unit 13 is driven.

As described above, according to the pull-out heating cooking apparatus 100, the predetermined region EA in the heating cooking chamber 100A can be heated by the first air sending unit 14, and the entire inside of the heating cooking chamber 100A can be heated by the second air sending unit 13. That is, a desired region in the heating cooking chamber 100A can be easily heated by controlling the driving of each of the first air sending unit 14 and the second air sending unit 13.

Figure 8:
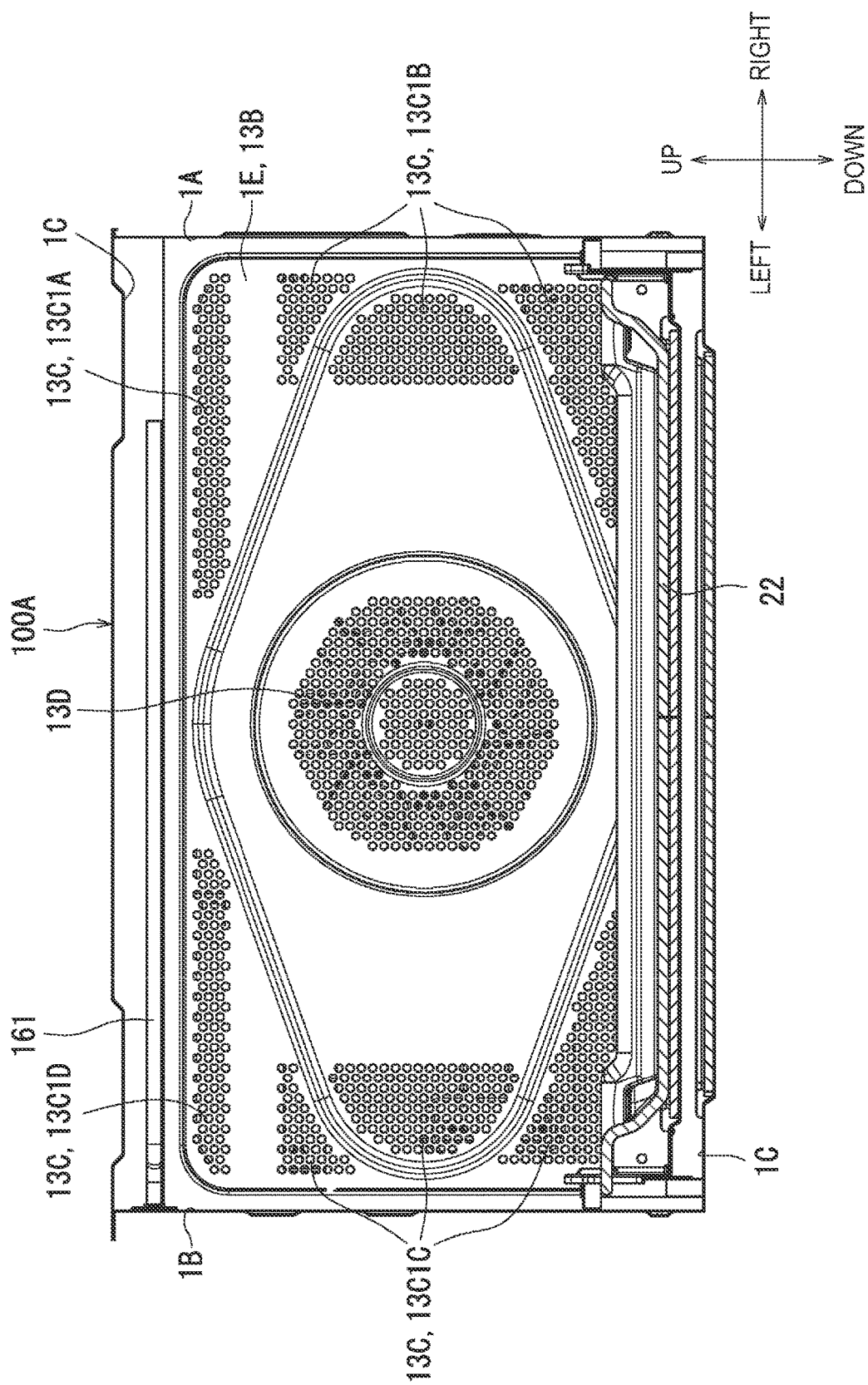
FIG. 8 is a front view illustrating the heating cooking chamber according to the present embodiment.

Next, the second air sending unit 13 according to the present embodiment will be further described with reference to FIG. 1 to FIG. 8. FIG. 8 is a front view illustrating the heating cooking chamber 100A according to the present embodiment.

The second partitioning member 13B is positioned behind the accommodation space 120. Specifically, the second partitioning member 13B is positioned between the second air sending chamber 13A and the heating cooking chamber 100A. The second partitioning member 13B is, for example, a plate-like member made of a metal. The shape of the second partitioning member 13B is, for example, a rectangular shape when viewed from the front side to the rear side. The second partitioning member 13B is disposed on substantially the entire surface of the back wall 1E. The second suction hole portion 13D and the second blow-out hole portion 13C are disposed in the second partitioning member 13B. Thus, the second suction hole portion 13D and the second blow-out hole portion 13C can be easily disposed behind the accommodation space 120.

More specifically, the second suction hole portion 13D is, for example, a set of a plurality of punched holes. Similarly, the second blow-out hole portion 13C is, for example, a set of a plurality of punched holes. The punched holes are examples of suction holes and blow-out holes. The punched holes each have, for example, a circular shape. The diameter of each of the punched holes of the second suction hole portion 13D and the second blow-out hole portion 13C is, for example, 3.4 mm. Thus, each of the second suction hole portion 13D and the second blow-out hole portion 13C has a small size. As a result, it is possible to prevent a tool or the like from being caught in the second suction hole portion 13D and the second blow-out hole portion 13C when the heating cooking chamber 100A is cleaned.

More specifically, the second blow-out hole portion 13C is disposed along the outer circumference of the second partitioning member 13B. The distance between the first blow-out hole portion 14C and the first suction hole portion 14D is shorter than the distance between the second blow-out hole portion 13C and the second suction hole portion 13D. As a result, in the present embodiment, the entire inside of the heating cooking chamber 100A can be heated by driving the second air sending unit 13. Specifically, the second suction hole portion 13D is positioned at the center portion of the second partitioning member 13B. The set of the plurality of punched holes of the second suction hole portion 13D has, for example, a circular shape. On the other hand, the second blow-out hole portion 13C is positioned at a peripheral edge along the edge of the back wall 1E. Specifically, the second blow-out hole portion 13C includes a first peripheral edge blow-out hole portion 13C1A, a second peripheral edge blow-out hole portion 13C1B, a third peripheral edge blow-out hole portion 13C1C, and a fourth peripheral edge blow-out hole portion 13C1D. When the pull-out heating cooking apparatus 100 is viewed from the front, the first peripheral edge blow-out hole portion 13C1A is positioned in an upper right region of the back wall 1E. The second peripheral edge blow-out hole portion 13C1B is positioned in a lower right region of the back wall 1E. The third peripheral edge blow-out hole portion 13C1C is positioned in a lower left region of the back wall 1E. The fourth peripheral edge blow-out hole portion 13C1D is positioned in an upper left region of the back wall 1E. Note that the distance between the blow-out hole portion and the suction hole portion refers to the distance between the center of the suction hole portion and the blow-out hole farthest from the center of the suction hole portion.

The second centrifugal fan 132 opposes the heating cooking chamber 100A through the second partitioning member 13B. The second suction hole portion 13D opposes the second centrifugal fan 132.

Now, the flow of the second hot air F2 will be described in detail. First, the second air sending unit 13 suctions the second hot air F2 in the heating cooking chamber 100A into the second air sending chamber 13A through the second suction hole portion 13D by the second centrifugal fan 132. The second hot air F2 taken into the second air sending chamber 13A is heated by the second heater 131. The second air sending unit 13 blows the second hot air F2 in the second air sending chamber 13A into the heating cooking chamber 100A through the second blow-out hole portion 13C by the second centrifugal fan 132. The second hot air F2 blown into the heating cooking chamber 100A mainly moves forward along the right wall 1A and the left wall 1B. Thereafter, the second hot air F2 that has reached the rear face 21B of the door portion 21 moves backward so that the movement direction of the second hot air F2 is reversed. Then, the second hot air F2 that has reached the object H to be heated moves backward along the object H to be heated. The second hot air F2 moving backward moves within the heating cooking chamber 100A. Thereafter, the second hot air F2 is taken into the second air sending chamber 13A again from the second suction hole portion 13D. In this manner, the second air sending unit 13 circulates the second hot air F2 between the inside of the second air sending chamber 13A and the inside of the heating cooking chamber 100A.

As described above, according to the pull-out heating cooking apparatus 100, the second blow-out hole portion 13C is disposed along the outer circumference of the second partitioning member 13B, and thus the entire inside of the heating cooking chamber 100A can be more uniformly heated by the second air sending unit 13.

As illustrated in FIG. 5 and FIG. 6, the pull-out heating cooking apparatus 100 further includes a grill unit 16. Specifically, the grill unit 16 includes a heating cooking heater 161 and an energization unit 162. The heating cooking heater 161 is positioned in the first direction D1 with respect to the accommodation space 120 and heats the object H to be heated. More specifically, the heating cooking heater 161 is positioned in an upper portion inside the heating cooking chamber 100A. The heating cooking heater 161 has a substantial U-shape when viewed from the upper side to the lower side. In the present embodiment, three grill units 16 are disposed. The heating cooking heater 161 is, for example, a sheathed heater.

The energization unit 162 is positioned outside of the left wall 1B. The energization unit 162 energizes the heating cooking heater 161. The energization unit 162 is controlled by the control unit 5. That is, the control unit 5 controls the driving of the grill unit 16. The energized heating cooking heater 161 generates heat.

As described above, according to the pull-out heating cooking apparatus 100 of the present invention, because the heating cooking heater 161 is provided, the first hot air F1 is heated not only by the first heater 141 but also by the heating cooking heater 161. As a result, the predetermined region EA in the heating cooking chamber 100A can be heated in a shorter period of time.

Figure 9:
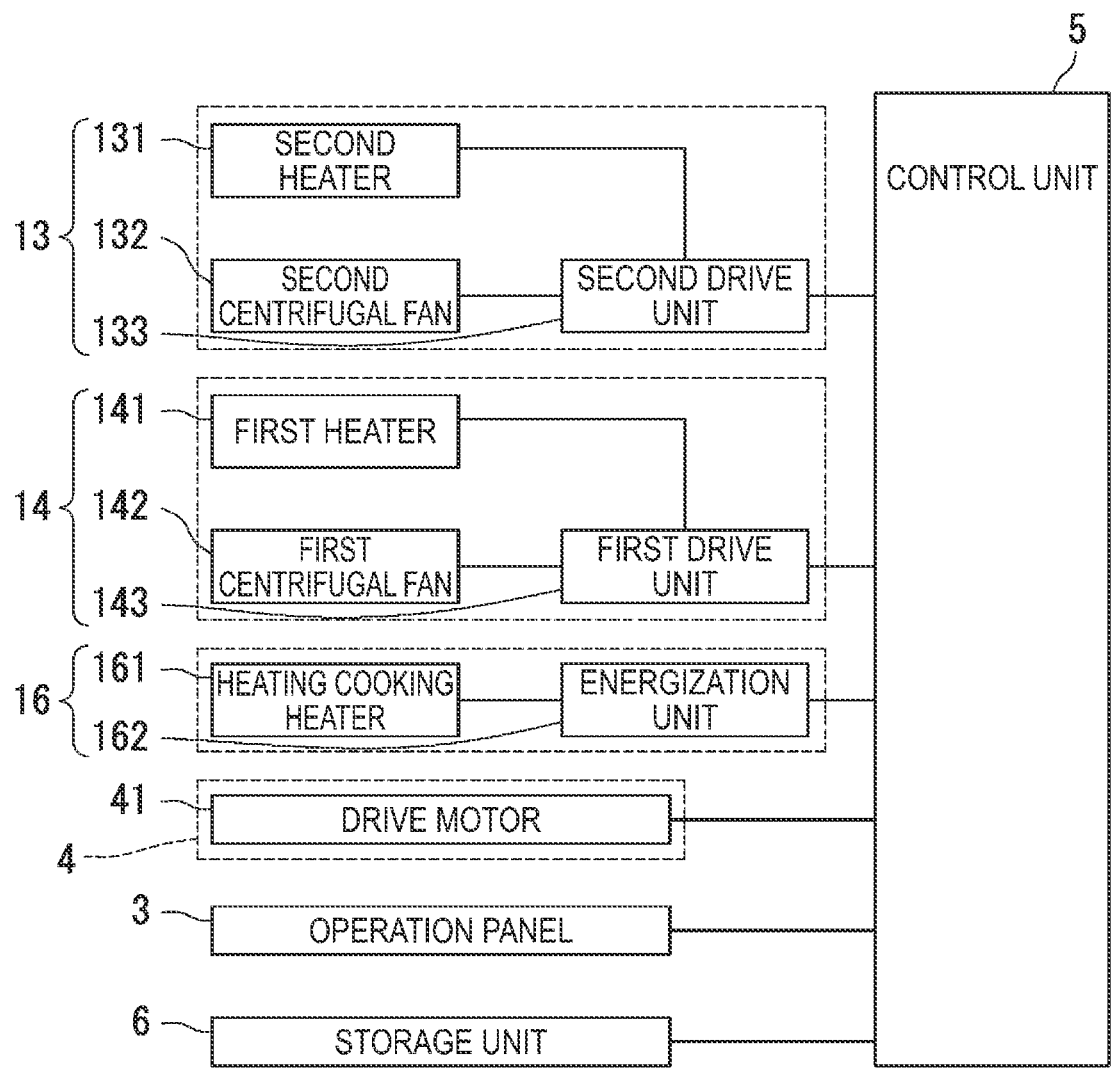
FIG. 9 is a block diagram illustrating a configuration of the pull-out heating cooking apparatus according to the present embodiment.

A configuration of the pull-out heating cooking apparatus 100 will be described in detail with reference to FIG. 9. FIG. 9 is a block diagram illustrating a configuration of the pull-out heating cooking apparatus 100 according to the present embodiment.

In the present embodiment, the pull-out heating cooking apparatus 100 has a "first hot air circulation heating mode", a "second hot air circulation heating mode", a "third hot air circulation heating mode", and a "grill heating mode" as heating cooking modes. The "first hot air circulation heating mode" is a mode in which the object H to be heated is heated and cooked by directly blowing the first hot air F1 onto an upper face of the object H to be heated. The "second hot air circulation heating mode" is a mode in which the predetermined region EA in the heating cooking chamber 100A is preheated in a short period of time by circulating the first hot air F1 in the heating cooking chamber 100A. The "third hot air circulation heating mode" is mainly a mode in which the object H to be heated is heated and cooked by circulating the second hot air F2 in the entire heating cooking chamber 100A to make the temperature in the heating cooking chamber 100A uniform. The "grill heating mode" is mainly a mode in which the object H to be heated is heated and cooked by transmitting heat generated by the heating cooking heater 161 to the object H to be heated.

As illustrated in FIG. 9, the control unit 5 controls the first drive unit 143, the second drive unit 133, the energization unit 162, the drive motor 41, the operation panel 3, and the storage unit 6 by executing control programs stored in the storage unit 6.

More specifically, the control unit 5 controls the driving of each of the first air sending unit 14, the second air sending unit 13, and the grill unit 16. For example, in a case where the "first hot air circulation heating mode" or the "second hot air circulation heating mode" is selected, the control unit 5 drives the first drive unit 143. The first drive unit 143 energizes the first heater 141 and drives the first centrifugal fan 142. As a result, the predetermined region EA in the heating cooking chamber 100A can be heated in a shorter period of time. On the other hand, in a case where the "third hot air circulation heating mode" is selected, the control unit 5 drives the second drive unit 133. The second drive unit 133 energizes the second heater 131 and drives the second centrifugal fan 132. As a result, the entire inside of the heating cooking chamber 100A can be heated in a short period of time.

Figure 10:
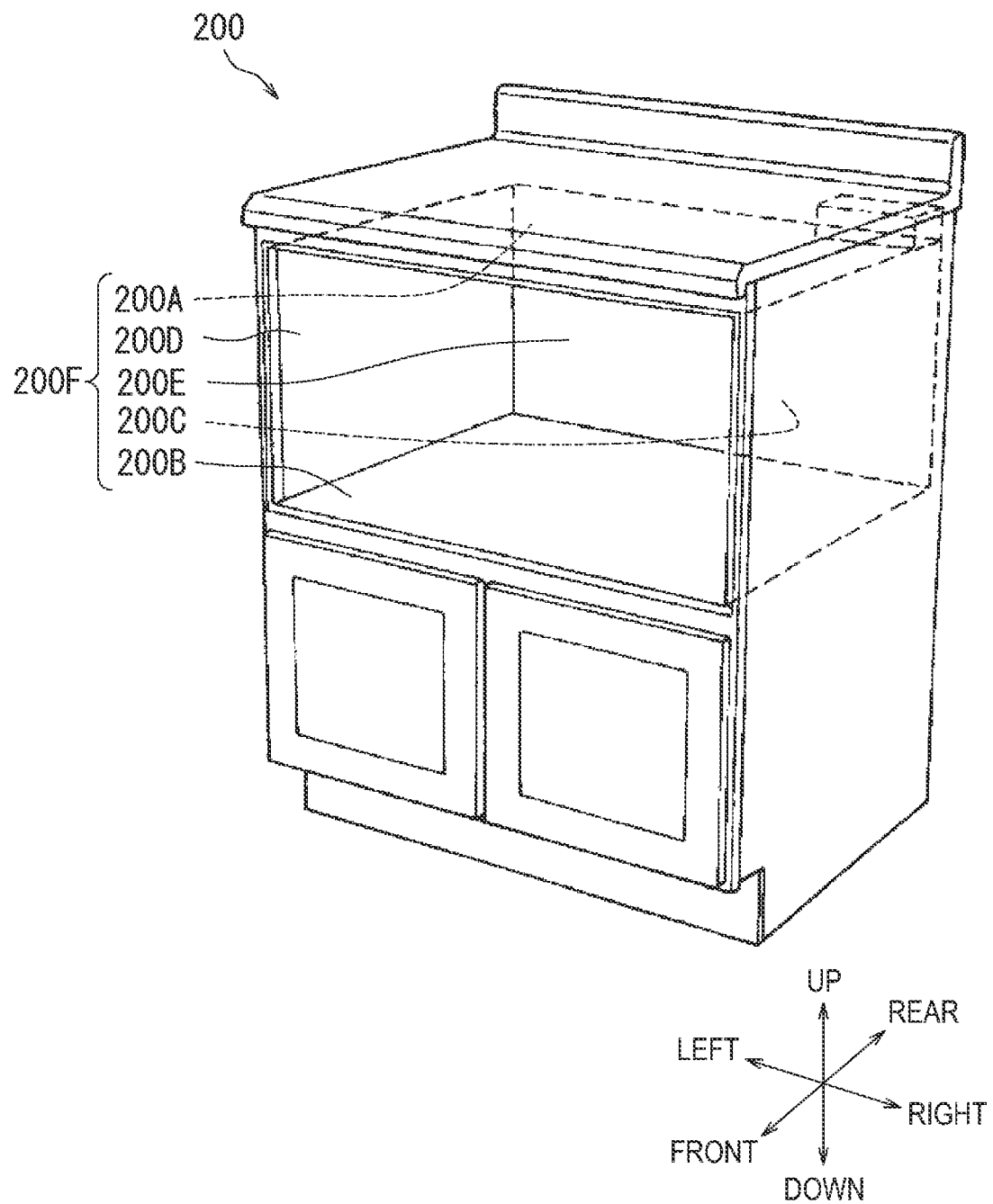
FIG. 10 is a perspective view illustrating the appearance of a cabinet to which the pull-out heating cooking apparatus according to the present embodiment is attached.

Next, a cabinet 200 to which the pull-out heating cooking apparatus 100 is attached will be described with reference to FIG. 10. FIG. 10 is a diagram illustrating an appearance of the cabinet 200 to which the pull-out heating cooking apparatus 100 according to the present embodiment is attached.

The pull-out heating cooking apparatus 100 is installed in the cabinet 200 in a built-in manner. As illustrated in FIG. 10, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space into which the pull-out heating cooking apparatus 100 is fitted.

Now, a control method by which the control unit 5 controls the second air sending unit 13 will be described in detail with reference to FIG. 11 to FIG. 18. Specifically, the control unit 5 controls the rotation speed of the second centrifugal fan 132. More specifically, the control unit 5 controls the second drive unit 133 so as to increase or reduce the rotation speed of the second centrifugal fan 132.

Figure 11:
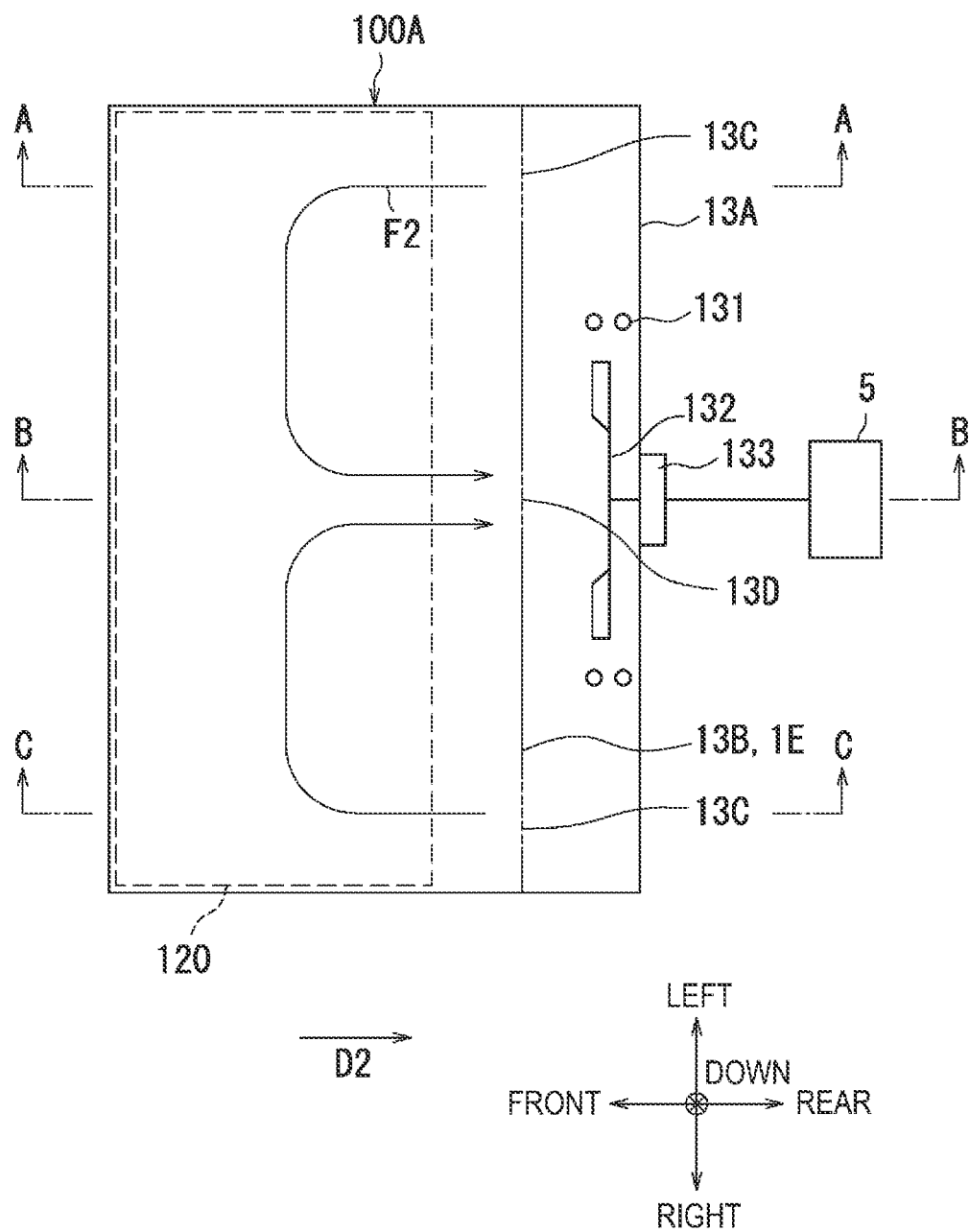
FIG. 11 is a diagram illustrating a cross section of the heating cooking chamber taken along a plane orthogonal to an up-down direction in the pull-out heating cooking apparatus according to the present embodiment.

FIG. 11 is a diagram illustrating a cross section of the heating cooking chamber 100A taken along a plane orthogonal to the up-down direction. As illustrated in FIG. 11, the second drive unit 133 drives the second centrifugal fan 132 so that the rotation speed of the second centrifugal fan 132 becomes lower than the rotation speed of the second centrifugal fan 132 illustrated in FIG. 7A. As a result, a blow distance of the second hot air F2 changes. The blow distance refers to, for example, a distance at which the second hot air F2 reaches a position farthest from the second partitioning member 13B.

As described above, according to the pull-out heating cooking apparatus 100, the rotation speed of the second centrifugal fan 132 is controlled. As a result, the blow distance of the second hot air F2 can be changed, and it is possible to reduce heating unevenness of the object H to be heated. In particular, this is effective in reducing heating unevenness in the front-rear direction and reducing heating unevenness on a bottom face side of a three-dimensional object H to be heated.

In addition, the control unit 5 controls the rotation direction of the second centrifugal fan 132. More specifically, as illustrated in FIG. 7B, the control unit 5 controls the second drive unit 133 so as to set the rotation direction of the second centrifugal fan 132 to a clockwise direction R1 or a counterclockwise direction R2.

Figure 12:
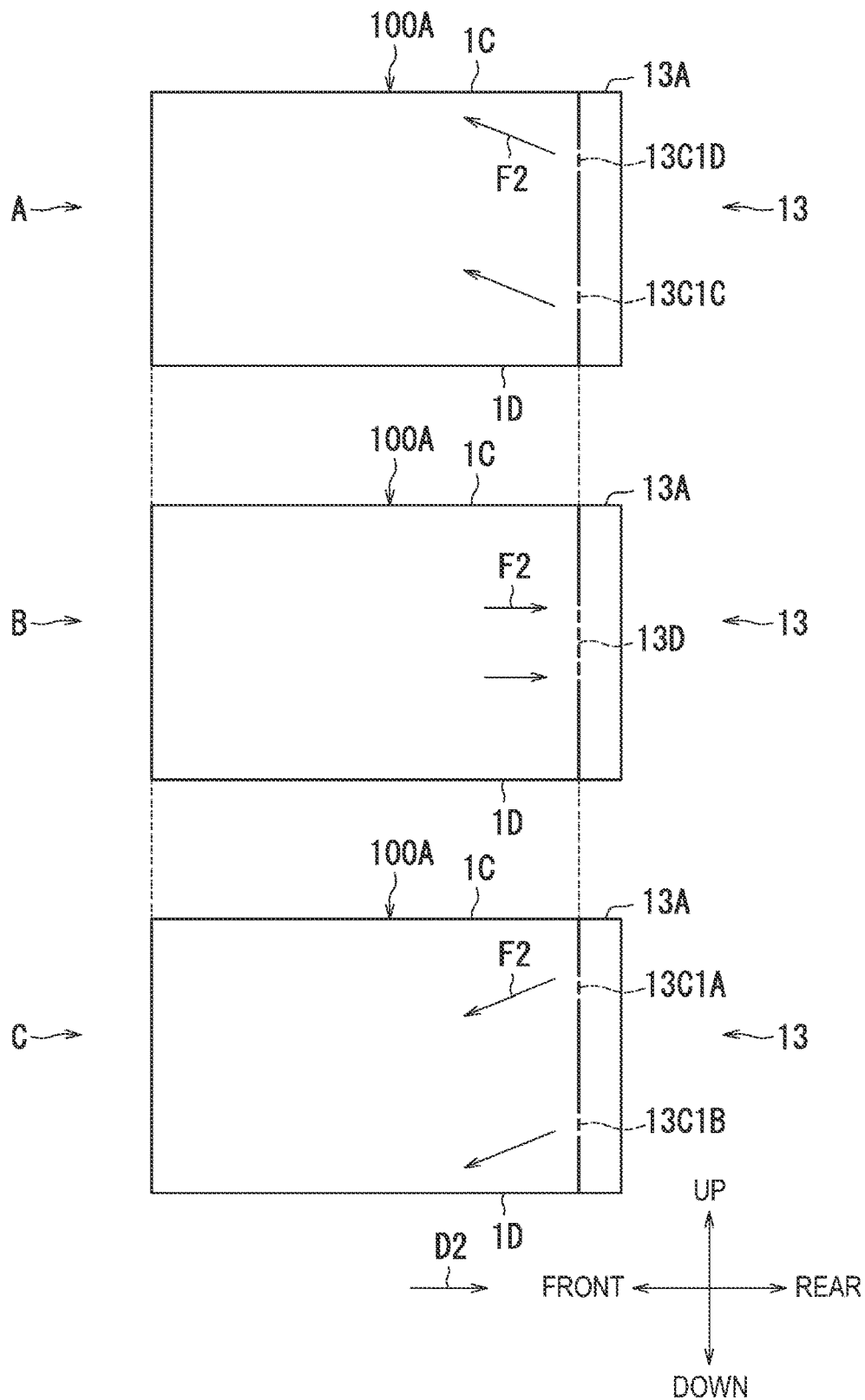
FIG. 12 is a diagram illustrating a cross section of the heating cooking chamber taken along a plane orthogonal to a left-right direction in the pull-out heating cooking apparatus according to the present embodiment.
Figure 13:
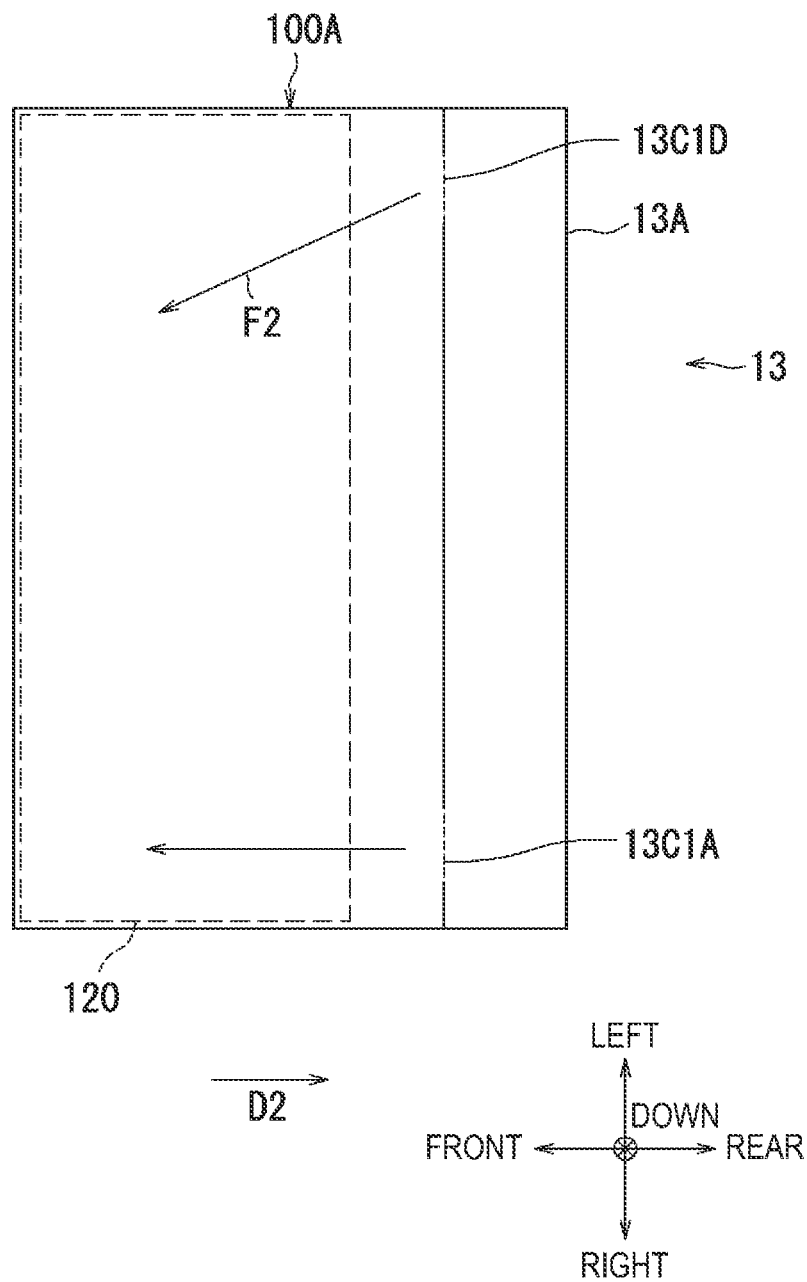
FIG. 13 is a diagram illustrating a cross section of the heating cooking chamber taken along a plane orthogonal to the up-down direction in the pull-out heating cooking apparatus according to the present embodiment.
Figure 14:
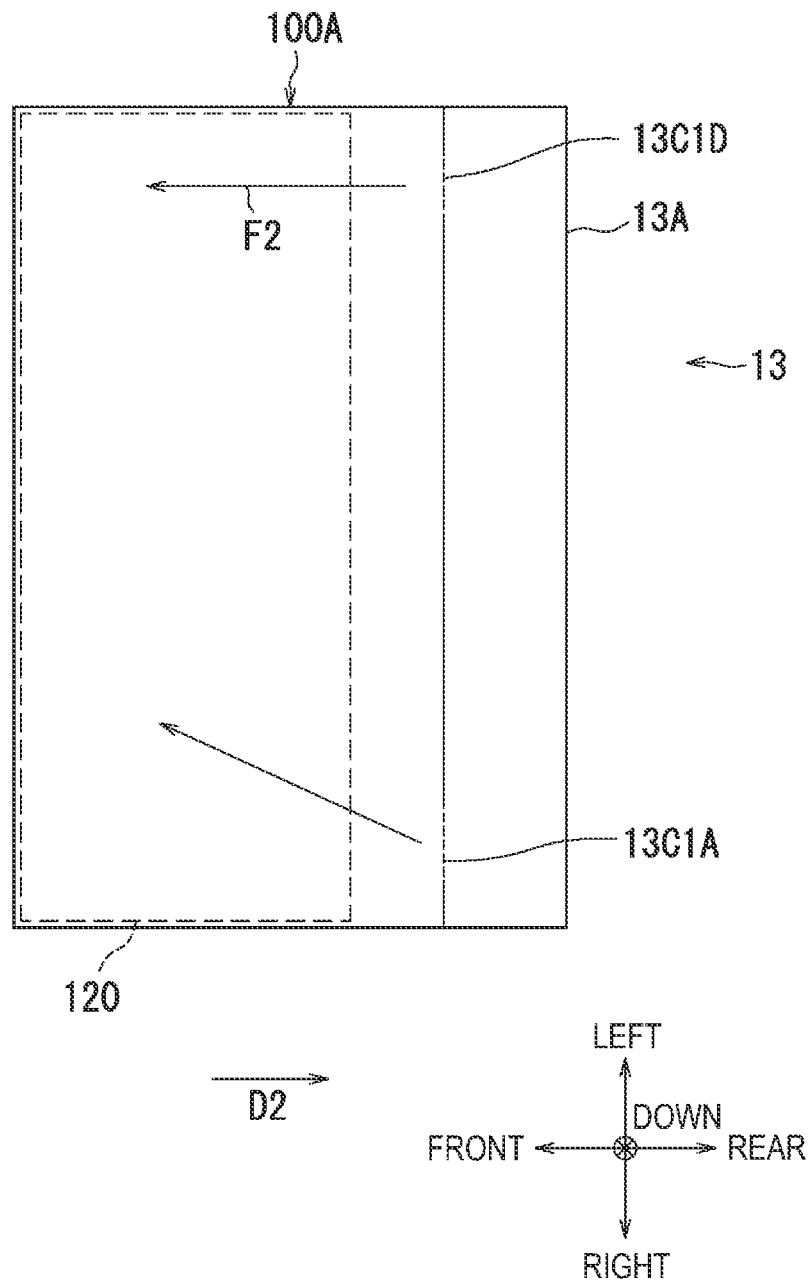
FIG. 14 is a diagram illustrating a cross section of the heating cooking chamber taken along a plane orthogonal to the up-down direction in the pull-out heating cooking apparatus according to the present embodiment.

For example, the control unit 5 controls the second drive unit 133 so that the rotation direction of the second centrifugal fan 132 is set to the clockwise direction R1. FIG. 12 is a diagram illustrating a cross section of the heating cooking chamber 100A taken along a plane orthogonal to the left-right direction. FIG. 13 and FIG. 14 are diagrams illustrating a cross section of the heating cooking chamber 100A taken along a plane orthogonal to the up-down direction.

More specifically, A in FIG. 12 is a cross-sectional view taken along the line A-A in FIG. 11. B in FIG. 12 is a cross-sectional view taken along the line B-B in FIG. 11. C in FIG. 12 is a cross-sectional view taken along the line C-C in FIG. 11. In addition, FIG. 13 is a cross-sectional view taken along the line D-D in FIG. 4. FIG. 14 is a cross-sectional view taken along the line E-E in FIG. 4.

As illustrated in B in FIG. 12, the second air sending unit 13 suctions the second hot air F2 in the heating cooking chamber 100A into the second air sending chamber 13A through the second suction hole portion 13D by the second centrifugal fan 132. The second hot air F2 taken into the second air sending chamber 13A is heated by the second heater 131.

The second air sending unit 13 blows the second hot air F2 in the second air sending chamber 13A into the heating cooking chamber 100A through the first peripheral edge blow-out hole portion 13C1A by the second centrifugal fan 132. As illustrated in C in FIG. 12 and in FIG. 13, the second hot air F2 blown into the heating cooking chamber 100A moves in a front downward direction. That is, the first peripheral edge blow-out hole portion 13C1A is positioned on the right side of the second centrifugal fan 132 in the clockwise direction R1 and no obstacle is present on the lower side thereof, and thus the second hot air F2 is blown down.

The second air sending unit 13 blows the second hot air F2 in the second air sending chamber 13A into the heating cooking chamber 100A through the second peripheral edge blow-out hole portion 13C1B by the second centrifugal fan 132. As illustrated in A in FIG. 12 and in FIG. 14, the second hot air F2 blown into the heating cooking chamber 100A moves toward the lower center. That is, the second peripheral edge blow-out hole portion 13C1B is positioned on the right side of the second centrifugal fan 132 in the clockwise direction R1 and includes the bottom wall 1D on the lower side thereof. Therefore, the second hot air F2 is guided to the center by the bottom wall 1D while being blown down.

Then, the second air sending unit 13 blows the second hot air F2 in the second air sending chamber 13A into the heating cooking chamber 100A through the third peripheral edge blow-out hole portion 13C1C by the second centrifugal fan 132. As illustrated in A in FIG. 12 and in FIG. 14, the second hot air F2 blown into the heating cooking chamber 100A moves upward. That is, the third peripheral edge blow-out hole portion 13C1C is positioned on the left side of the second centrifugal fan 132 in the clockwise direction R1 and no obstacle is present on the upper side thereof. Therefore, the second hot air F2 is blown up.

Furthermore, the second air sending unit 13 blows the second hot air F2 in the second air sending chamber 13A into the heating cooking chamber 100A through the fourth peripheral edge blow-out hole portion 13C1D by the second centrifugal fan 132. As illustrated in A in FIG. 12 and in FIG. 13, the second hot air F2 blown into the heating cooking chamber 100A moves toward the upper center. In other words, the fourth peripheral edge blow-out hole portion 13C1D is positioned on the left side of the second centrifugal fan 132 in the clockwise direction R1 and includes the top wall 1C on the upper side thereof. Therefore, the second hot air F2 is guided to the center by the top wall 1C while being blown up.

Figure 15:
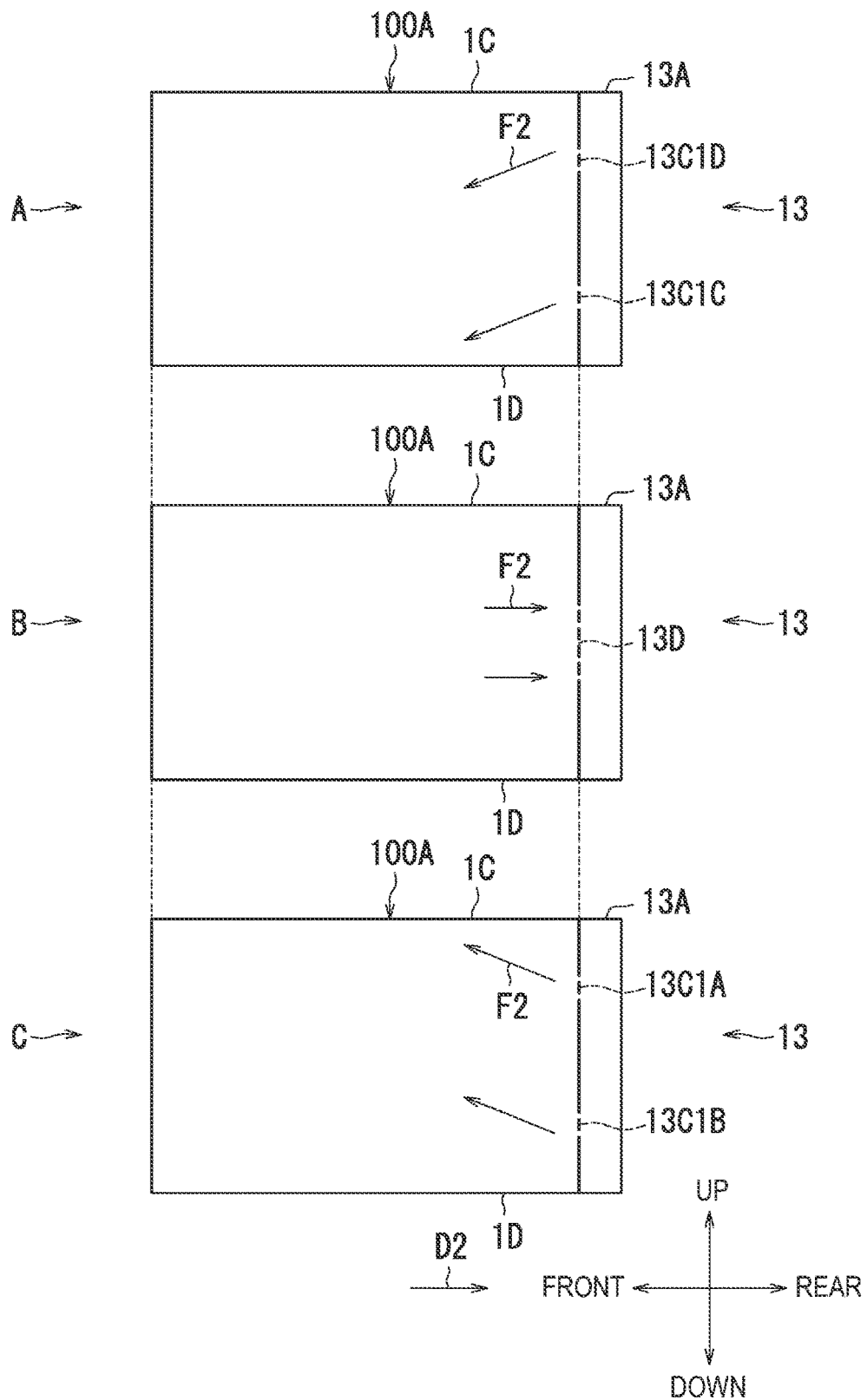
FIG. 15 is a diagram illustrating a cross section of the heating cooking chamber taken along a plane orthogonal to the left-right direction in the pull-out heating cooking apparatus according to the present embodiment.
Figure 16:
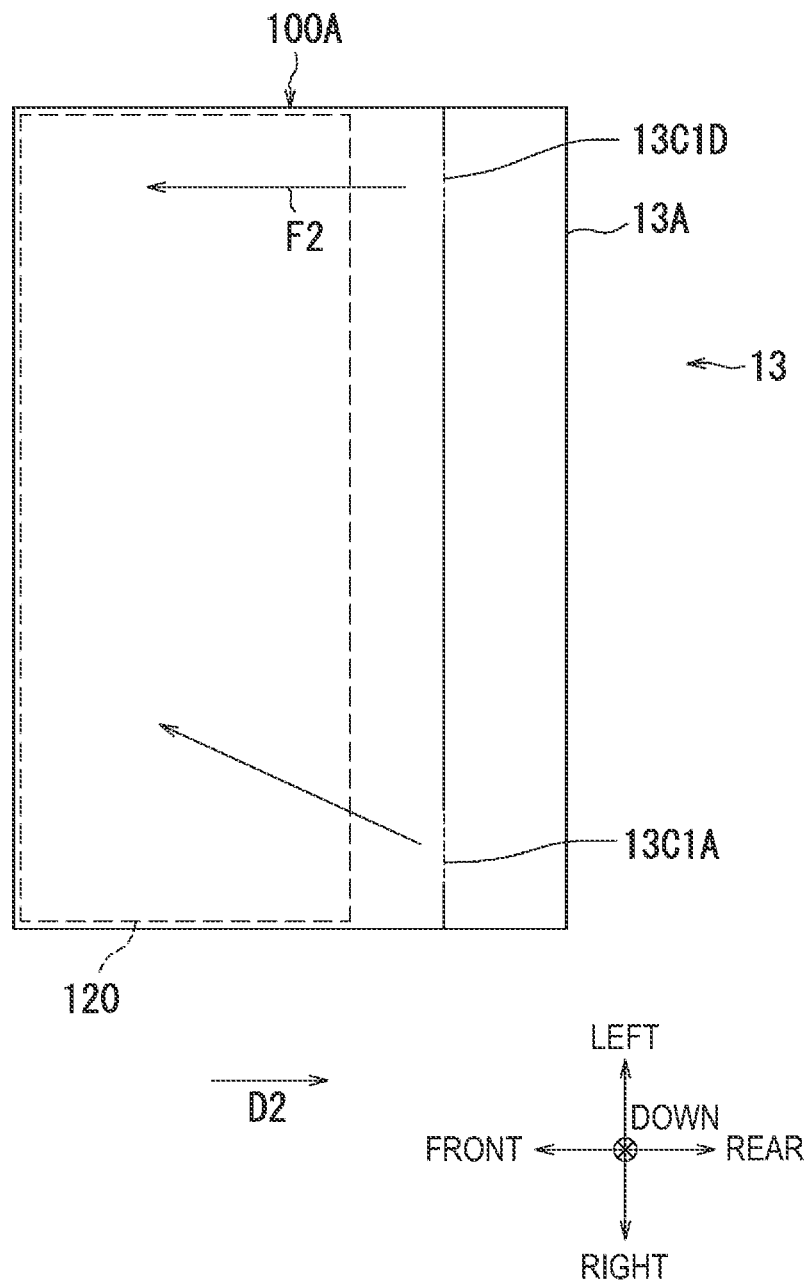
FIG. 16 is a diagram illustrating a cross section of the heating cooking chamber taken along a plane orthogonal to the up-down direction in the pull-out heating cooking apparatus according to the present embodiment.
Figure 17:
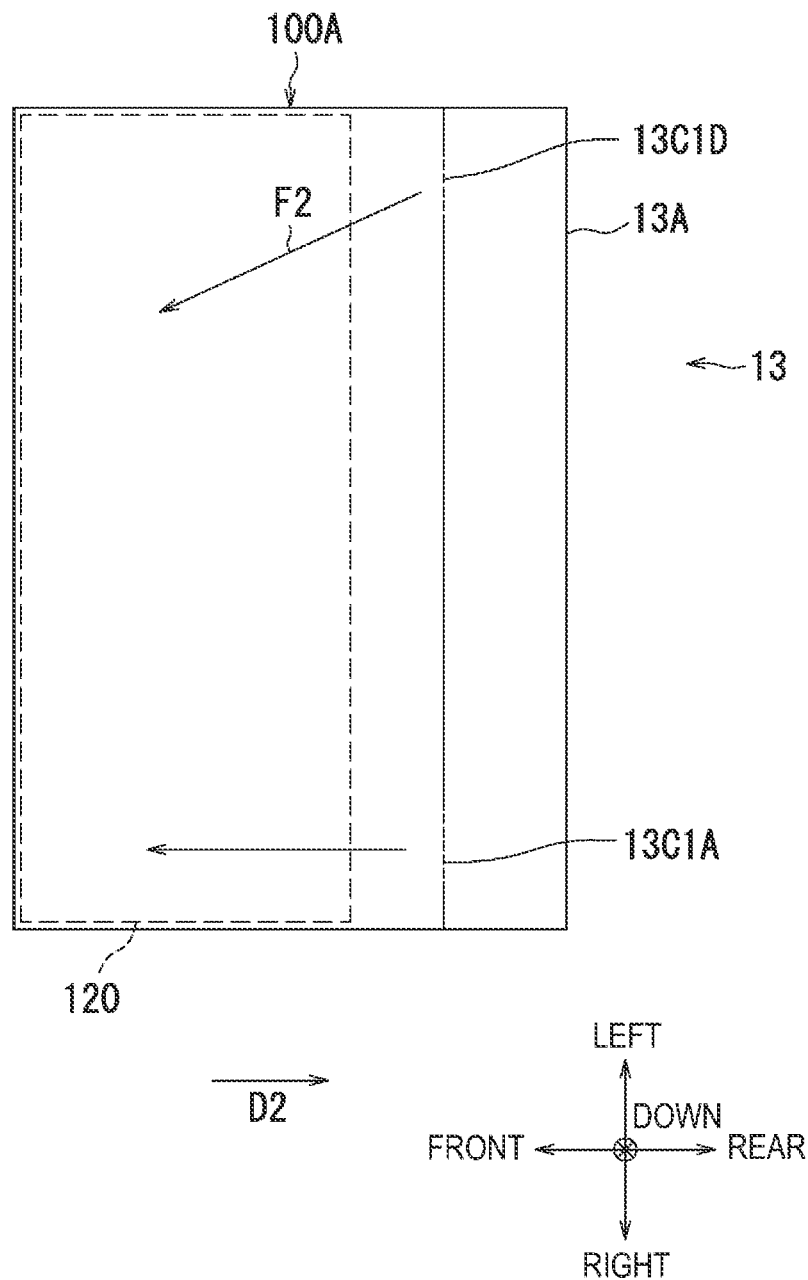
FIG. 17 is a diagram illustrating a cross section of the heating cooking chamber taken along a plane orthogonal to the up-down direction in the pull-out heating cooking apparatus according to the present embodiment.

On the other hand, the control unit 5 controls the second drive unit 133 so that the rotation direction of the second centrifugal fan 132 is set to be the counterclockwise direction R2. FIG. 15 is a diagram illustrating a cross section of the heating cooking chamber 100A taken along a plane orthogonal to the left-right direction. FIG. 16 and FIG. 17 are diagrams illustrating a cross section of the heating cooking chamber 100A taken along a plane orthogonal to the up-down direction.

More specifically, A in FIG. 15 is a cross-sectional view taken along the line A-A in FIG. 11. B in FIG. 15 is a cross-sectional view taken along the line B-B in FIG. 11. C in FIG. 15 is a cross-sectional view taken along the line C-C in FIG. 11. In addition, FIG. 15 is a cross-sectional view taken along the line D-D in FIG. 4. FIG. 14 is a cross-sectional view taken along the line E-E in FIG. 4.

As illustrated in B in FIG. 15, the second air sending unit 13 suctions the second hot air F2 in the heating cooking chamber 100A into the second air sending chamber 13A through the second suction hole portion 13D by the second centrifugal fan 132. The second hot air F2 taken into the second air sending chamber 13A is heated by the second heater 131.

In addition, the second air sending unit 13 blows the second hot air F2 in the second air sending chamber 13A into the heating cooking chamber 100A through the fourth peripheral edge blow-out hole portion 13C1D by the second centrifugal fan 132. As illustrated in A in FIG. 15 and in FIG. 16, the second hot air F2 blown into the heating cooking chamber 100A moves in a front downward direction. That is, the fourth peripheral edge blow-out hole portion 13C1D is positioned on the left side of the second centrifugal fan 132 in the counterclockwise direction R2 and no obstacle is present on the lower side thereof. Therefore, the second hot air F2 is blown down.

In addition, the second air sending unit 13 blows the second hot air F2 in the second air sending chamber 13A into the heating cooking chamber 100A through the third peripheral edge blow-out hole portion 13C1C by the second centrifugal fan 132. As illustrated in A in FIG. 15 and in FIG. 17, the second hot air F2 blown into the heating cooking chamber 100A moves toward the lower center. That is, the third peripheral edge blow-out hole portion 13C1C is positioned on the left side of the second centrifugal fan 132 in the counterclockwise direction R2 and includes the bottom wall 1D on the lower side thereof. Therefore, the second hot air F2 is guided to the center by the bottom wall 1D while being blown down.

Then, the second air sending unit 13 blows the second hot air F2 in the second air sending chamber 13A into the heating cooking chamber 100A through the second peripheral edge blow-out hole portion 13C1B by the second centrifugal fan 132. As illustrated in C in FIG. 15 and in FIG. 17, the second hot air F2 blown into the heating cooking chamber 100A moves upward. That is, the second peripheral edge blow-out hole portion 13C1B is positioned on the right side of the second centrifugal fan 132 in the counterclockwise direction R2 and no obstacle is present on the upper side thereof. Therefore, the second hot air F2 is blown up.

Furthermore, the second air sending unit 13 blows the second hot air F2 in the second air sending chamber 13A into the heating cooking chamber 100A through the first peripheral edge blow-out hole portion 13C1A by the second centrifugal fan 132. As illustrated in C in FIG. 15 and in FIG. 16, the second hot air F2 blown into the heating cooking chamber 100A moves toward the upper center. That is, the first peripheral edge blow-out hole portion 13C1A is positioned on the right side of the second centrifugal fan 132 in the counterclockwise direction R2 and includes the top wall 1C on the upper side thereof. Therefore, the second hot air F2 is guided to the center by the top wall 1C while being blown up.

As described above, according to the pull-out heating cooking apparatus 100, the rotation direction of the second centrifugal fan 132 is controlled. As a result, the blow-up direction of the second hot air F2 can be changed, and heating unevenness of the object H to be heated can be reduced. In particular, this is effective in reducing heating unevenness in the left-right direction and reducing heating unevenness on side faces of a three-dimensional object H to be heated.

Figure 18:
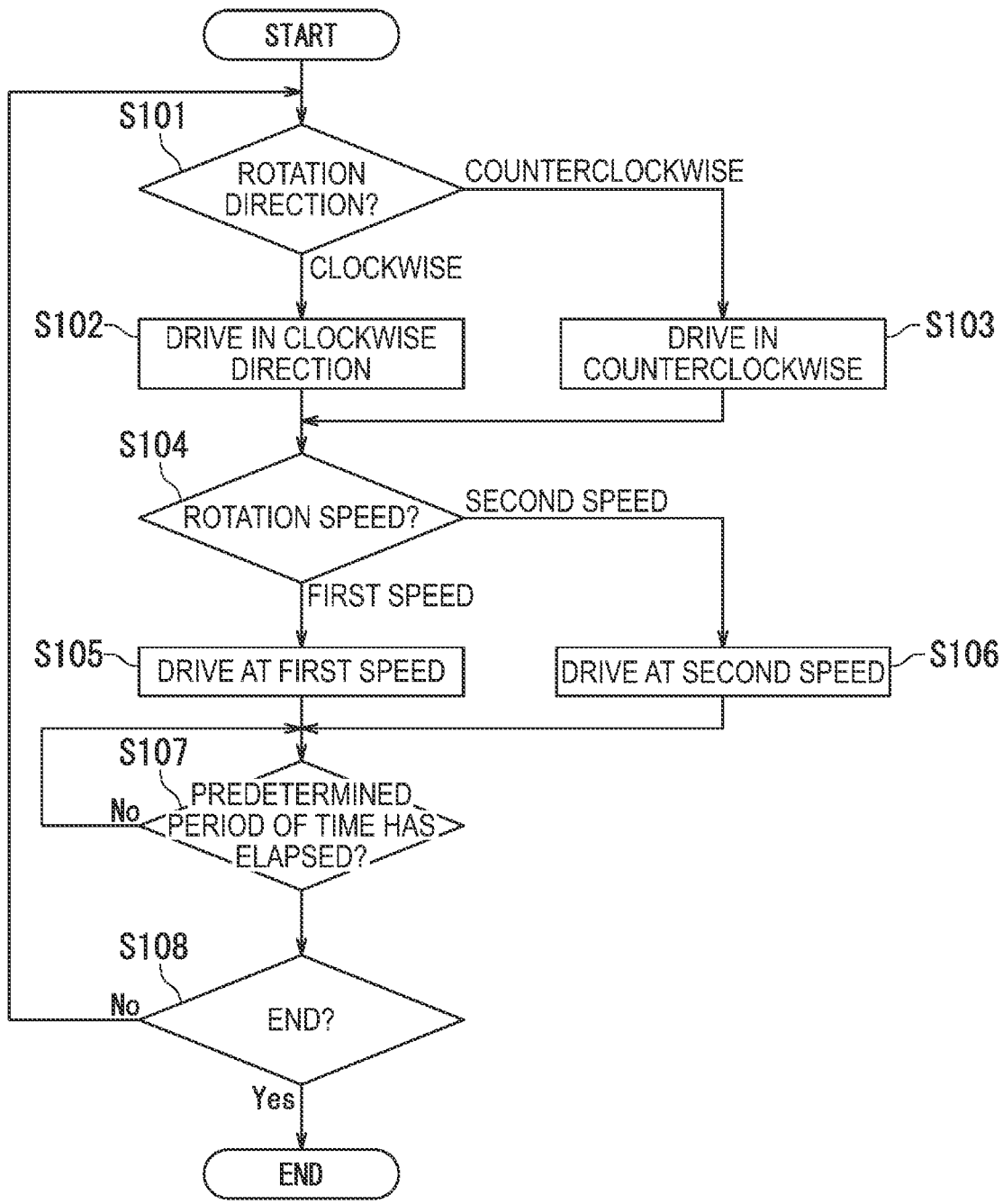
FIG. 18 is a flowchart illustrating an example of processing of a control unit according to the present embodiment.

Next, an example of processing of the control unit 5 according to the present embodiment will be described with reference to FIG. 18. FIG. 18 is a flowchart illustrating an example of processing of the control unit 5. As illustrated in FIG. 18, the processing of the control unit 5 includes steps S101 to S108. For example, the control unit 5 controls the second air sending unit 13 on the basis of the "third hot air circulation heating mode" input via the operation panel 3 and information on the object H to be heated. A method of controlling the second air sending unit 13 is stored in advance in the storage unit 6. More specifically, in the control method, information on the object H to be heated, the rotation direction of the second air sending unit 13, the rotation speed of the second air sending unit 13, and a predetermined period of time are associated with each other.

First, in step S101, the control unit 5 determines the rotation direction of the second centrifugal fan 132. In a case where the control unit 5 determines that the rotation direction is the clockwise direction R1, the processing proceeds to step S102. On the other hand, in a case where the control unit 5 determines that the rotation direction is the counterclockwise direction R2, the processing proceeds to step S103.

In step S102, the second drive unit 133 drives the second centrifugal fan 132 in the clockwise direction R1. Then, the processing proceeds to step S104.

On the other hand, in step S103, the second drive unit 133 drives the second centrifugal fan 132 in the counterclockwise direction R2. Then, the processing proceeds to step S104.

In step S104, the control unit 5 determines the rotation speed of the second centrifugal fan 132. In a case where the control unit 5 determines that the rotation speed is a first speed, the processing proceeds to step S105. On the other hand, in a case where the control unit 5 determines that the rotation speed is a second speed, the processing proceeds to step S106. The second speed is lower than the first speed.

In step S105, the second drive unit 133 drives the second centrifugal fan 132 at the first speed. Then, the processing proceeds to step S107.

On the other hand, in step S106, the second drive unit 133 drives the second centrifugal fan 132 at the second speed. Then, the processing proceeds to step S107.

In step S107, the control unit 5 determines whether a predetermined period of time has elapsed. In a case where the control unit 5 determines that a predetermined period of time has not elapsed, the processing returns to step S107. On the other hand, in a case where the control unit 5 determines that a predetermined period of time has elapsed, the processing proceeds to step S108.

In step S108, the control unit 5 determines whether to terminate the processing. In a case where the control unit 5 determines not to terminate the processing, the processing returns to step S101. On the other hand, in a case where the control unit 5 determines to terminate the processing, the control unit 5 terminates the processing.

As described above, according to the pull-out heating cooking apparatus 100, the rotation direction and the rotation speed of the second centrifugal fan 132 are controlled. As a result, it is possible to reduce heating unevenness of the object H to be heated, and particularly, to adjust heating balance of a three-dimensional object H to be heated.

An embodiment of the present invention has been described above with reference to the drawings. However, the present invention is not limited to the embodiment described above, and the present invention can be implemented in various modes without departing from the gist of the disclosure. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. The material, shape, dimensions, and the like of each of the constituent elements illustrated in the embodiment described above are merely exemplary and are not particularly limiting, and various modifications can be made within the scope not departing from the effects of the present invention in essence.

(1) As described above with reference to FIG. 1 to FIG. 18, the pull-out heating cooking apparatus 100 includes the first air sending unit 14 and the second air sending unit 13, but the present invention is not limited thereto. For example, the pull-out heating cooking apparatus 100 may further include an air sending unit different from the first air sending unit 14 and the second air sending unit 13.

(2) The pull-out heating cooking apparatus 100 may include a microwave supply unit that supplies microwaves to the heating cooking chamber 100A.

(3) As described with reference to FIG. 1 to FIG. 18, each of the first blow-out hole portion 14C, the first suction hole portion 14D, the second blow-out hole portion 13C, and the second suction hole portion 13D are collections of a plurality of punched holes, but the present invention is not limited thereto. For example, each of the first blow-out hole portion 14C, the first suction hole portion 14D, the second blow-out hole portion 13C, and the second suction hole portion 13D may be one opening portion, may be a plurality of slit holes, or may be a net-like member.

(4) As described with reference to FIG. 1 to FIG. 18, the first direction D1 is a vertical upward direction, but the present invention is not limited thereto. For example, the first direction may be along a horizontal direction.

(5) As described with reference to FIG. 1 to FIG. 18, the first hot air F1 blown from the first blow-out hole portion 14C moves downward, but the present invention is not limited thereto. For example, the first hot air F1 blown from the first blow-out hole portion 14C may move downward in a spiral manner with the first suction hole portion 14D serving as a central axis.

(6) As described with reference to FIG. 1 to FIG. 18, the pull-out heating cooking apparatus 100 includes the pull-out body 2, but the present invention is not limited thereto. For example, the pull-out heating cooking apparatus 100 may include a rotary table on the bottom wall 1D without including the pull-out body 2. In addition, the pull-out heating cooking apparatus 100 may have a rack. The rack is placed on the placing portion 22 of the pull-out body 2.

INDUSTRIAL APPLICABILITY

The present invention is useful in the field of a heating cooking apparatus, for example.

REFERENCE SIGNS LIST

1 Heating chamber
14 First air sending unit
14A First air sending chamber
14B First partitioning member
14C First blow-out hole portion
14D First suction hole portion
141 First heater
142 First centrifugal fan
100 Pull-out heating cooking apparatus
100A Heating cooking chamber
120 Accommodation space
130 First space

The invention claimed is:

1. A heating cooking apparatus comprising:
a heating cooking chamber configured to accommodate an object to be heated;
a first air sending unit having a first heater, the first heater being located outside the heating cooking chamber;
a heating cooking heater positioned in a first direction with respect to an accommodation space in the heating cooking chamber; and
a second air sending unit,
wherein the heating cooking chamber has the accommodation space for accommodating the object to be heated, p1 the first air sending unit includes a first suction hole portion positioned in the first direction with respect to the accommodation space, and a first blow-out hole portion positioned in the first direction with respect to the accommodation space,
the second air sending unit includes a second suction hole portion positioned in a second direction different from the first direction with respect to the accommodation space, and a second blow-out hole portion positioned in the second direction with respect to the accommodation space,
the first air sending unit suctions air inside the heating cooking chamber through the first suction hole portion and blows air into the heating cooking chamber through the first blow-out hole portion, and
the second air sending unit suctions air inside the heating cooking chamber through the second suction hole portion and blows air into the heating cooking chamber through the second blow-out hole portion.

2. The heating cooking apparatus according to claim 1, wherein the first direction is a vertical upward direction, the second direction intersects the first direction,
the first suction hole portion and the first blow-out hole portion are disposed in a top wall of the heating cooking chamber, and
the second suction hole portion and the second blow-out hole portion are disposed in a side wall of the heating cooking chamber.

3. The heating cooking apparatus according to claim 1, wherein a distance between the first blow-out hole portion and the first suction hole portion is shorter than a distance between the second blow-out hole portion and the second suction hole portion.

4. The heating cooking apparatus according to claim 1, wherein the first air sending unit further includes a first centrifugal fan, and the second air sending unit further includes a second centrifugal fan different from the first centrifugal fan.

5. The heating cooking apparatus according to claim 4, wherein a size of the second centrifugal fan is greater than a size of the first centrifugal fan.

6. The heating cooking apparatus according to claim 1, wherein the first air sending unit further includes a first air sending chamber,
the second air sending unit further includes a second air sending chamber, and
a size of the second air sending chamber is greater than a size of the first air sending chamber.

7. The heating cooking apparatus according to claim 4, further comprising:
a control unit configured to control the second air sending unit,
wherein the control unit controls a rotation speed of the second centrifugal fan.

8. The heating cooking apparatus according to claim 4, further comprising:
a control unit configured to control the second air sending unit,
wherein the control unit controls a rotation direction of the second centrifugal fan.

9. The heating cooking apparatus according to claim 7, further comprising:
a grill unit including the heating cooking heater and configured to heat the object to be heated,
wherein the control unit further controls driving of the grill unit.

* * * * *